US007154042B2

(12) United States Patent
Auray et al.

(10) Patent No.: US 7,154,042 B2
(45) Date of Patent: Dec. 26, 2006

(54) ELECTRICAL CONNECTOR WITH SNAP FIT RETAINER RING CONSTRUCTED TO ENHANCE THE CONNECTION OF THE CONNECTOR TO AN ELECTRICAL BOX

(75) Inventors: Delbert Auray, Southport, CT (US); Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/400,606

(22) Filed: Apr. 7, 2006

(65) Prior Publication Data

US 2006/0180330 A1 Aug. 17, 2006

Related U.S. Application Data

(63) Continuation-in-part of application No. 11/364,435, filed on Feb. 28, 2006, which is a continuation-in-part of application No. 11/258,990, filed on Oct. 26, 2005, now Pat. No. 7,057,107, which is a continuation-in-part of application No. 11/151,374, filed on Jun. 13, 2005, now Pat. No. 7,075,007, which is a continuation-in-part of application No. 11/100,250, filed on Apr. 6, 2005, now Pat. No. 7,064,272, which is a continuation-in-part of application No. 10/939,619, filed on Sep. 13, 2004, now Pat. No. 6,916,988.

(51) Int. Cl.
*H02G 3/00* (2006.01)

(52) U.S. Cl. .................. 174/70 R; 174/480; 174/68.1; 174/68.3; 174/72 C; 174/69; 174/71 R; 174/650; 174/506; 439/92; 439/587; 439/557; 439/320; 439/535; 439/567; 439/142

(58) Field of Classification Search ............. 174/65 R, 174/65 G, 68.1, 68.3, 72 C, 69, 71 R, 506, 174/650, 480, 70 R; 439/92, 587, 557, 320, 439/535, 567, 142
See application file for complete search history.

(56) References Cited

U.S. PATENT DOCUMENTS

| | | | |
|---|---|---|---|
| 1,483,218 | A | 2/1924 | Fahnestock |
| 1,725,883 | A | 8/1929 | Recker |
| 1,830,250 | A | 11/1931 | Tiefenbacher |
| 2,156,003 | A | 4/1939 | Tinnerman |
| 2,160,353 | A | 5/1939 | Conners |
| 2,445,663 | A | 7/1948 | Peters |

(Continued)

*Primary Examiner*—Dean A. Reichard
*Assistant Examiner*—Anton B. Harris
(74) *Attorney, Agent, or Firm*—Fattibene & Fattibene; Arthur T. Fattibene; Paul A. Fattibene

(57) ABSTRACT

An electric connector assembly disclosing various embodiments, each of which includes a connector body having a frustro-conically shaped outlet end portion that converges toward the outlet opening and having a complementary frustro conically shaped retainer ring circumscribing the outlet end portion wherein the retainer ring is integrally formed with a locking tang and ground tangs arranged to be snap fitted to a knock-out hole of an electric box. The latest embodiment includes a frustro-conical retainer ring having an auxiliary tang arranged to permit the connector assembly to be obliquely inserted and locked to a knock-out hole of an electric box using a minimum of applied force for effecting a snap fit connection to both lock and electrically ground the connector assembly to the electric box and a method of installing the associated connector body to an electric box.

16 Claims, 21 Drawing Sheets

38 37 33 30 40A 45A 43 S 31A 47 31 31B 40 46 39 41 40B

U.S. PATENT DOCUMENTS 2,744,769 A 5/1956 Roeder et al.
2,823,932 A 2/1958 Schigut
3,183,297 A 5/1965 Curtiss
3,436,105 A 4/1969 Miklya
3,544,705 A 12/1970 Winston
3,631,738 A 1/1972 Harper
3,788,582 A 1/1974 Swanquist
3,814,467 A 6/1974 Van Buren, Jr.
3,858,151 A 12/1974 Paskert
3,993,333 A 11/1976 Biswas
4,012,578 A 3/1977 Moran et al.
4,021,604 A 5/1977 Dola et al.
4,032,178 A 6/1977 Neuroth
4,248,459 A * 2/1981 Pate et al. .................. 285/319
4,361,302 A 11/1982 Lass
4,468,535 A 8/1984 Law
4,619,332 A 10/1986 Sheehan
4,621,166 A 11/1986 Neuroth
4,626,620 A 12/1986 Plyler
4,657,212 A 4/1987 Gilmore et al.
4,711,472 A 12/1987 Schnell
4,773,280 A 9/1988 Baumgarten
4,880,387 A 11/1989 Stikeleather et al.
4,981,310 A 1/1991 Belisaire
4,990,721 A 2/1991 Sheehan
5,132,493 A 7/1992 Sheehan
5,171,164 A 12/1992 O'Neil et al.
5,189,258 A 2/1993 Pratesi
5,266,050 A 11/1993 O'Neil et al.
5,342,994 A 8/1994 Pratesi
5,422,437 A 6/1995 Schnell
6,034,326 A 3/2000 Jorgensen
6,043,432 A 3/2000 Gretz
6,080,933 A 6/2000 Gretz
6,114,630 A 9/2000 Gretz
6,133,529 A 10/2000 Gretz
6,194,661 B1 2/2001 Gretz
6,355,884 B1 1/2002 Gretz et al.
6,352,439 B1 3/2002 Stark et al.
6,380,483 B1 4/2002 Blake
6,444,907 B1 9/2002 Kiely
6,476,322 B1 * 11/2002 Dunne et al. ............. 174/68.1
6,555,750 B1 4/2003 Kiely
6,604,400 B1 8/2003 Gretz
6,670,553 B1 12/2003 Gretz
6,682,355 B1 1/2004 Gretz
6,737,584 B1 5/2004 Kiely
6,768,057 B1 7/2004 Blake
6,780,029 B1 8/2004 Gretz
6,849,803 B1 2/2005 Gretz
6,860,758 B1 3/2005 Kiely
6,872,886 B1 3/2005 Kiely
6,916,988 B1 7/2005 Auray et al.

* cited by examiner

FIG. 24
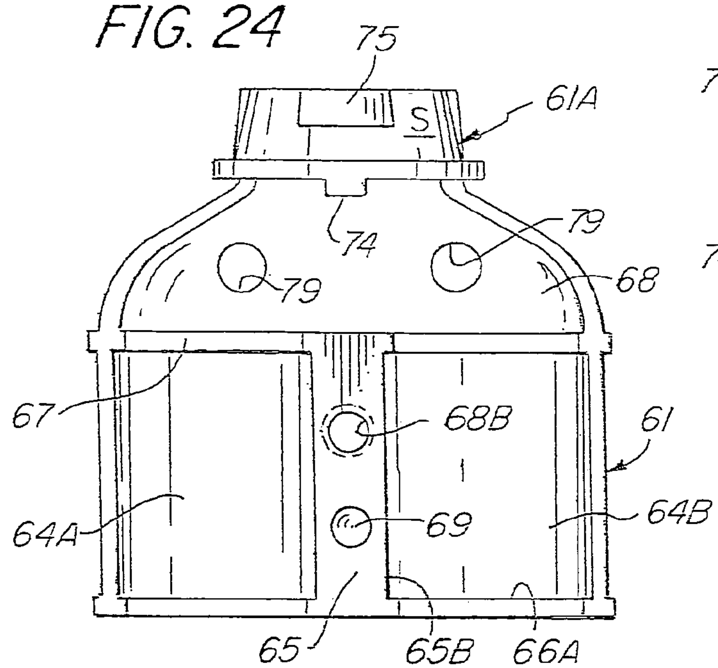
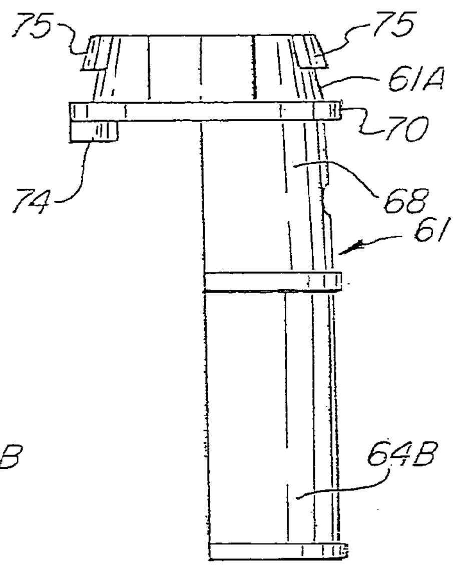
FIG. 25
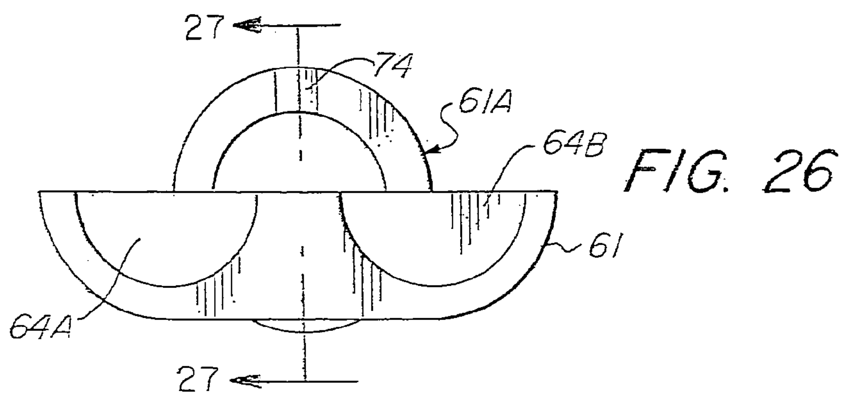
FIG. 26
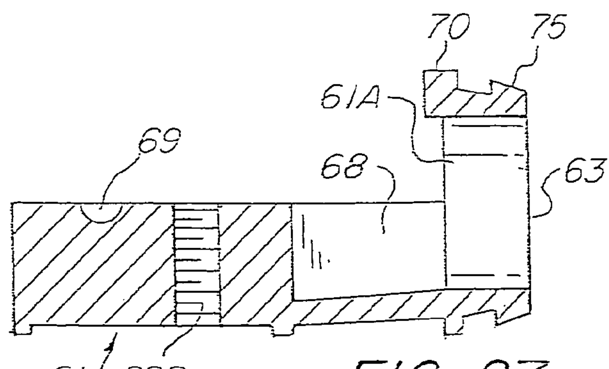
FIG. 27

80
81
81A
81B
82
82A
83
84
84A
84B
84C
85
85A
85B
86
88
89
95
F4
F5
F6

83A
83B
87
87A
87B
87C
F1
F2
F3

91
91A
92
93

ELECTRICAL CONNECTOR WITH SNAP FIT RETAINER RING CONSTRUCTED TO ENHANCE THE CONNECTION OF THE CONNECTOR TO AN ELECTRICAL BOX

RELATED APPLICATIONS

This application is a continuation in part application of a continuation in part application of application Ser. No. 11/364,435 filed Feb. 28, 2006 for Snap-Fit Electrical Connector Assembly For Facilitating The Connection of the Electric Connector Assembly To An Electric Box, which is a continuation in part of application Ser. No. 11/258,990 filed Oct. 26, 2005 now U.S. Pat. No. 7,057,107, which is a continuation in part of application Ser. No. 11/151,374 filed Jun. 13, 2005 now U.S. Pat. No. 7,075,007 for Snap Fit Electrical Connector Assembly With conical Outer Snap Fit Retainer And One Or More Internal Snap Fit Wire Retainers, which is a continuation in part of application Ser. No. 11/100,250 filed Apr. 6, 2005 now U.S. Pat. No. 7,064,272 for Snap In Electrical Connector Assembly With Unidirectional Wire Conductor Retainer Ring, which is a continuation in part application of application Ser. No. 10/939,619 filed Sep. 13, 2004 for Electrical Connector With Frustro Conical Snap Fit Retaining Ring, now U.S. Pat. No. 6,916, 988 B1, each of which are incorporated herein by reference.

FIELD OF THE INVENTION

This invention is directed to a further advancement in the field of electrical connectors having a retaining ring capable of being "snap fitted" to an electric box, and more specifically to an electrical connector having a frustro-conical shaped retainer ring with locking and grounding tangs constructed and arranged to enhance the manner in which the connector assembly can be readily connected to a knock-out hole of an electric box with a minimum of force.

This invention is also directed to other advancements in the field of electrical connector assemblies having a snap fit retaining ring circumscribing the outlet end of a connector body for effecting a snap fit connection to an electrical box such as described in U.S. Pat. Nos. 6,860,758 and 6,935,891.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded lock nut or by means of a circular snap fit retaining ring of the type disclosed in U.S. Pat. Nos. 6,860,758; 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement. Connectors formed as connector caps which are adapted to be fitted over the end of a conductor, cable or wires, such as disclosed in U.S. Pat. No. 4,880,387, are also known. Various other known efforts to facilitate the connection of an electrical conductor to an electric box are evidenced by U.S. Pat. Nos. 6,043,432; 6,080,933; 6,114,630; 6,133,529; 6,194,661; 6,335,488; 6,352,439; 6,355,884; 6,444,907; 6,555,750; 6,604,400; 6,670,553; 6,737,584; 6,682,355; 6,780,029 and 6,849,803.

While such "snap fit" connectors have been in use for some time, the attachment of such "snap-fit" connectors to an electric box require the application of a considerable amount of force to deflect the locking tangs in order to push or pull the connector and retainer ring through a knock-out hole of an electric box. This is because such "snap fit" retaining rings are formed of spring steel so that the locking tangs, due to the inherent nature of the spring steel, require a good amount of force to flex the locking tangs in order to pass through the conventional knock-out hole to properly seat and lock the connector to a knockout hole of an electric box.

Frequently, an installer or user may not have sufficient access necessary to apply the necessary force to manually pull the leading end of the connector assembly through the knockout hole due to the relative rigid flexibility of the locking tangs in order to seat and lock the connector assembly to the knockout opening. Usually, the installer or user has to exert a considerable pulling force on the wires extending through the connector assembly to seat and lock a snap-fit connector assembly in the knockout hole of an electric box. Applying such pulling force directly on the wires to lock a snap-fit connector assembly to an electric box could seriously damage the conducting wires. Accordingly, continuing efforts are being made in order to minimize the amount of force necessary to effect the connection of an electrical connector utilizing a so-called "snap fit" electric connector assembly.

SUMMARY OF THE INVENTION

An object of this invention is to provide an electric connector with a frustro-conically shaped retaining ring having a leading end formed with a diameter which is less than the diameter of the trailing end, whereby the force applied to deflect the locking tang to pass through a knock-out hole is reduced to a minimum.

Another object of this invention is to provide an electric connector constructed and shaped so as to be obliquely insertable through a knock-out hole of an electric box or panel.

Another object is to provide an electric connector having an external frustro-conical retaining ring with an integrally formed resilient locking tang and an oppositely disposed tang defining a fulcrum about which the connector and retaining ring may pivot relative to a knock-out hole effecting the locking of the connector and associated retaining ring relative to the knock-out hole of an electric box.

Another object is to provide an electric connector and associated retaining ring with a resiliently formed locking tang and an oppositely disposed tang defining a fulcrum about which the connector and the retaining ring may pivot for effecting the locking and electrical grounding of the connector and retainer ring to an electric box.

An object of this invention is to provide an electrical connector with a frustro-conically shaped retaining ring having integrally formed locking tangs and electrical grounding tangs.

Another object of this invention is to provide for an electrical connector assembly that includes an electrical connector body having an outlet end with a frustro-conical outer surface having a complementary frustro-conical retaining ring that is readily fitted to and retained on the outlet end portion of the connector body.

Another object is to provide a connector assembly having an outlet end about which there is disposed a retaining ring having an opening sized to receive the working end of a tool functioning as a lever to transmit a pulling force on the connector and associated retaining ring to pull the connector and associated retaining ring through a knockout hole to seat and lock the connector assembly to the electric box with a minimum of effort or force.

Another object is to provide a unique tool for engaging an enlarged retaining slot formed in the retaining ring having laterally outwardly bent locking tangs which functions as a lever for exerting a pulling force on the connector and associated retainer ring to seat and lock the same to an electric box.

Another object is to provide a connector assembly comprising a connector body having an outlet portion free of any retaining flange, and an associated snap fit retainer ring circumscribing the outlet end portion.

Another object is to provide a retaining ring having a face portion with outwardly flaring circumscribing arms or sides having locking and grounding tangs that are readily formed out of a surface of the respective arms or sides.

Another object is to provide a retaining ring, adapted to be fitted onto the outlet end of a connector body, and having a frustro-conical shape with a first series of tangs for securing the connector body relative to an electrical box and a second series of tangs for affecting a positive electrical ground with an associated electrical box.

Another object is to provide a frustro-conically shaped retaining ring that can be readily formed from a blank of spring steel.

Another object is to provide an electrical connector assembly having a connector body with a frustro-conical outer retainer ring circumscribing the outer surface of the connector body outlet end and a unidirectional retainer ring or sleeve associated with the inlet end of the connector for securing an electrical wire or conductor thereto.

Another object is to provide an electrical connector assembly that includes an internal unidirectional sleeve insert for frictionally retaining a wire conductor to the connector assembly so as to prevent any unintentional separation of a wire conductor therefrom.

Another object is to provide an electrical connector assembly with an outer frustro-conical retainer ring for attaching a connector assembly to an electrical box with a snap fit and including an inner unidirectional retainer ring or sleeve for securing a wire conductor thereto in a manner to prohibit any unintentional separation of the wire conductor from the connector assembly.

Another object is to provide an electrical connector with an improved wire retainer sleeve or ring whereby a wire conductor is positively secured thereto simply by inserting the wire conductor into the connector so that unintentional separation of the wire conductor from the connector assembly is prohibited.

Another object of this invention is to provide an electrical connector with a wire retainer ring whereby a helical wound wire conductor can be secured upon mere insertion or threading the armored conductor wire into the wire retainer ring to prohibit any unintentional separation of the wire conductor from the electrical connector.

Another object is to provide or an electrical connector assembly that is relatively simple to fabricate and positive in operation.

Another object of this invention is to provide an electrical connector assembly having an outer frustro conical retainer ring for positively connecting the connector assembly to an electrical box and having multiple inlet ends, each fitted with an internal wire retainer ring for unidirectional locking therein a wire conductor in each of the multiple inlets.

Another object of this invention is to provide an improved multiple connector assembly that is relatively simple in structure, easy to assemble and having a minimum of component parts.

Another object is to provide a connector assembly having multiple inlet ends, each inlet end being fitted with internal spring steel internal retaining ring arranged to maximize electrical conductivity or grounding.

Another object is to provide an electrical connector having an outer frustro-conical retainer ring forming a snap fit attachment to an electric box or panel and having an improved unidirectional wire conductor retainer in the form of a retaining finger projecting into the inlet end of a connector body so as to provide a snap fit wire retention device which prohibits any unintentional separation of the wire conductor form the connector.

Another object is to provide a relatively simple and positive acting snap fit wire conductor retaining device for securing and retaining a wire conductor to an electrical connector in a manner to prohibit any unintentional separation of a wire conductor from the connector.

Another object is to provide a snap fit wire retainer that extends inwardly of an electrical connector body constructed so that the wire retainer is externally secured to the exterior of the connector body so as to facilitate the assembly of the connector and associated wire retainer.

Another object is to provide an electrical connector having a wire retainer arranged to be externally secured to the connector in a fixed relationship relative to the connector so that the free end thereof extends into the inlet end portion of the connector so that a wire conductor may be unidirectionally snap fitted thereto.

The foregoing objects and other features and advantages are attained by an electrical connector assembly that includes a connector body having an inlet end portion for receiving an electrical conductor and an outlet end portion which is adapted to be inserted through a knockout hole of an electrical panel or electric box, e.g. an electric outlet box or the like. A radially outwardly extending flange circumscribes an intermediate portion of the connector body to function as a stop to limit the insertion of the outlet end portion of the connector body through the knockout hole of an electric box. The outlet end portion is provided with an outer surface that converges or tapers inwardly toward the outlet opening thereof. Formed on the surface of the outlet end portion are one or more retaining lugs, which may be circumferentially spaced about the outlet end portion. A frustro-conically shaped snap ring is fitted onto the outlet end portion.

In accordance with this invention, the outer retaining ring is initially formed from a blank of sheet material, e.g. spring steel, having a cruciform shape that includes a face portion with a central opening wherein the radiating arms of the cruciform blank are disposed about the face portion to define a frustro-conical ring or cup. The ring so formed is provided with blanked out or die cut tangs to define locking tangs and grounding tangs. The frustro-conical ring so formed also has a slot adapted to receive the retaining lug when the retaining ring is fitted onto the outlet end portion of the connector body so that the free or trailing ends of the ring define grounding tangs that engage the inner periphery of the knockout hole of an electric box for effecting positive electrical continuity and grounding.

To form the retaining ring, the cruciform arms are arranged to be folded relative to the front or face forming portion of the blank, which is provided with a central opening, to define a unitary frustro-conically shaped cuplike member to compliment or be fitted onto the outlet end portion of the connector body. The retaining ring thus formed is fitted over or onto the outlet end portion whereby the retaining slot formed in the ring is adapted to receive the complementary retaining lug formed on the surface of the outlet end portion for retaining the ring on the outlet end portion of the connector body. In one form of the invention, as will be described herein, the retainer ring is provided with an enlarged slot, i.e. the slot has a width which is greater than the width of the lug to be received therein.

With the construction described, the connector assembly can be readily inserted through the knockout opening of an electric box wherein the locking tangs will initially be flexed inwardly to pass through the knock-out hole of an electric box, and then spring outwardly to lock the connector assembly to the electric box with the grounding tangs or free ends of the retaining ring or arms being inherently biased or urged against the internal periphery of the knockout hole to effect a positive electric ground, due to the inherent resiliency of the respective tangs and the material from which they are formed.

Because the locking tangs are formed of spring steel and are relatively short, considerable force is required to flex the locking tangs inwardly and to overcome the inherent spring bias of the locking tangs sufficiently to push the connector assembly through the opening or knockout hole of an electric box. When an electric box is concealed within a wall, considerable difficulty has been encountered in attaching a connector assembly to an electric box by means of a "snap fit" retainer ring. In such situations, electric connectors having a threaded outlet end have been generally used, whereby such threaded connectors could be readily secured by a lock nut from within the electric box.

This invention further contemplates providing a tool that will engage an enlarged slot of a modified retainer ring embodiment of this invention whereby the tool functions as a lever to transmit the necessary pulling force on the modified connector assembly to pull the "snap ring" connector assembly through the knockout opening of an electrical box with a minimum of ease.

This invention further contemplates providing the inlet end of the connector with an inner or internal retainer ring which is uniquely formed for positively securing thereto a wire conductor by merely inserting the wire conductor into the inner retainer ring, so that the wire conductor is prohibited from being unintentionally separated therefrom. The inner retainer ring is preferably formed of a blank of spring metal material which is rolled to form a cylinder or sleeve having an outer diameter which can be frictionally retained within the inlet end of a connector, e.g. by a press or friction fit.

A further embodiment of the disclosed invention utilizes a simplified clamping arrangement for securing the wire conductor to the inlet end of the connector by a mere insertion. In the event the wire conductor has a helical wound armored shield, e.g. a BX wire conductor, such armored wire conductor may be alternatively secured to the wire retainer ring or sleeve by threading the armored conductor to the wire retainer ring or sleeve.

A further embodiment of the invention utilizes a connector body having complementary housing or body sections which can be mated together and secured by a fastener. One of the body sections is formed wih a leading end that is provided with an outer frustro conical surface and a trailing end having multiple chambers interconnected to the leading end by a transition section. The other body section defines a trailing end complementing the trailing end portion of the other housing section. An outer frustro conical retainer ring circumscribes the leading end of the connector body to provide a snap fit connection for the connector assembly to a knockout hole of an electric box. The respective chambers, defined by the mated complementary trailing ends of the connector, are each fitted with a spring steel retainer sleeve to provide a snap fit connection between a wire conductor and its corresponding inlet end of the assembled connector body section. The arrangement is such that each of the respective wire retainers is securely clamped between the respective body sections to provide a very positive surface to surface contact between the wire retainer and the associated body sections to enhance the electrical continuity between the assembled connector body sections and the wire retainer clamped therebetween.

A still further embodiment of the invention utilizes a modified connector body provided with a frustro conical outlet end having a frustro conical shaped external snap fit retaining ring by which the connector assembly can be readily attached to an electrical panel or electrical box by a snap fit, and having a uniquely formed wire retainer device that clips onto the inlet end of the connector body and is externally secured to the connector body for enhancing ease of assembly while providing the wire retainer to extend into the inlet end of the connector body with sufficient flexibility and range of movement for retaining a wire conductor or conductor sheath within the connector body in a manner to prohibit any unintentional separation of the wire conductor or sheath from the connector body.

Another embodiment of the invention includes a connector body having an inlet end portion and an outlet end portion wherein the outlet end portion slopes downward toward the outlet end opening to define a frustro-conical shape adapted to receive a complementary shaped outer external frustro-conical retaining ring wherein the leading end of the retainer ring has a diameter which is less than the diameter of the trailing end of the retainer ring. In this form of the invention, the retainer ring has at least one locking tang and a series of grounding tangs formed or blanked out of the surface of the retaining ring. Opposite the locking tang, the retaining ring is formed with an auxiliary or fulcrum tang about which the connector may pivot for effecting the connection of the connector assembly to a knock-out opening of an electric box with a minimum of force and a maximum of ease. The arrangement is such that the auxiliary tang may function as either a locking tang or as both a locking and grounding tang depending upon whether the auxiliary tang is formed so as to engage only a wall portion of an electric box or both the wall surface of an electric box and the inner peripheral surface of the knock-out hole.

IN THE DRAWINGS

FIG. 24 is the interior plan view of one section of the connector housing of the embodiment illustrated in FIG. 20.

FIG. 25 is an outer end view of FIG. 24.

FIG. 26 is an end view of the connector housing section of FIG. 24.

FIG. 27 is a sectional view of the housing section taken along line 27—27 on FIG. 26.

DETAILED DESCRIPTION

Figure 1:
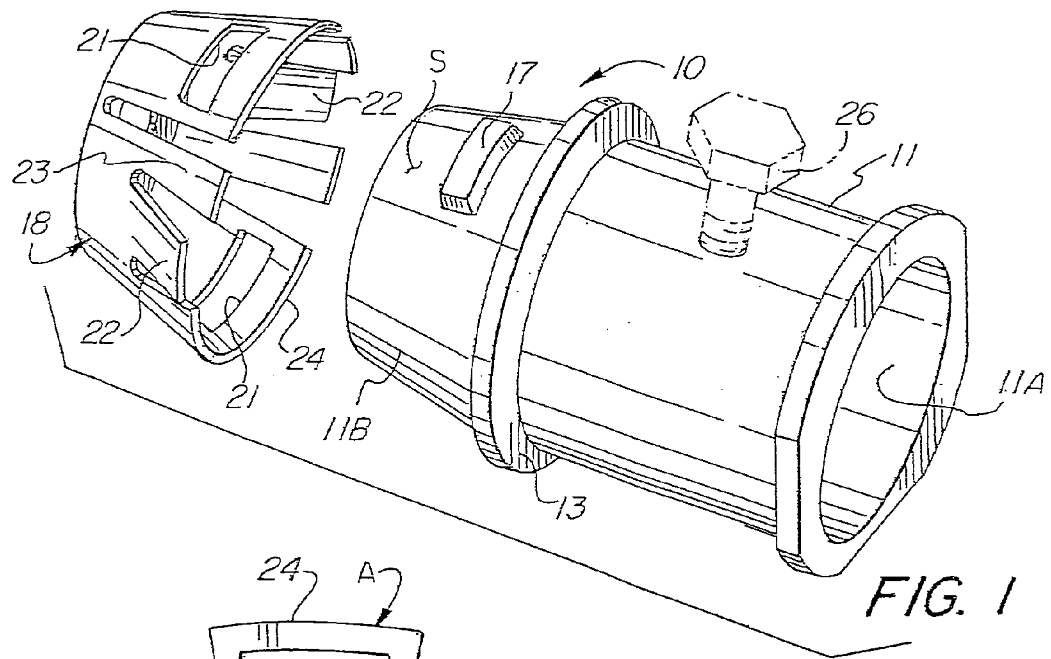
FIG. 1 is an exploded perspective view of the electrical connector assembly.

Referring to the drawings, there is shown in FIG. 1 an electrical connector assembly 10. The connector assembly 10 includes a connector body 11, which is usually formed of metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box 15, as noted in FIG. 8.

Figures 6, 7, 8, 10:
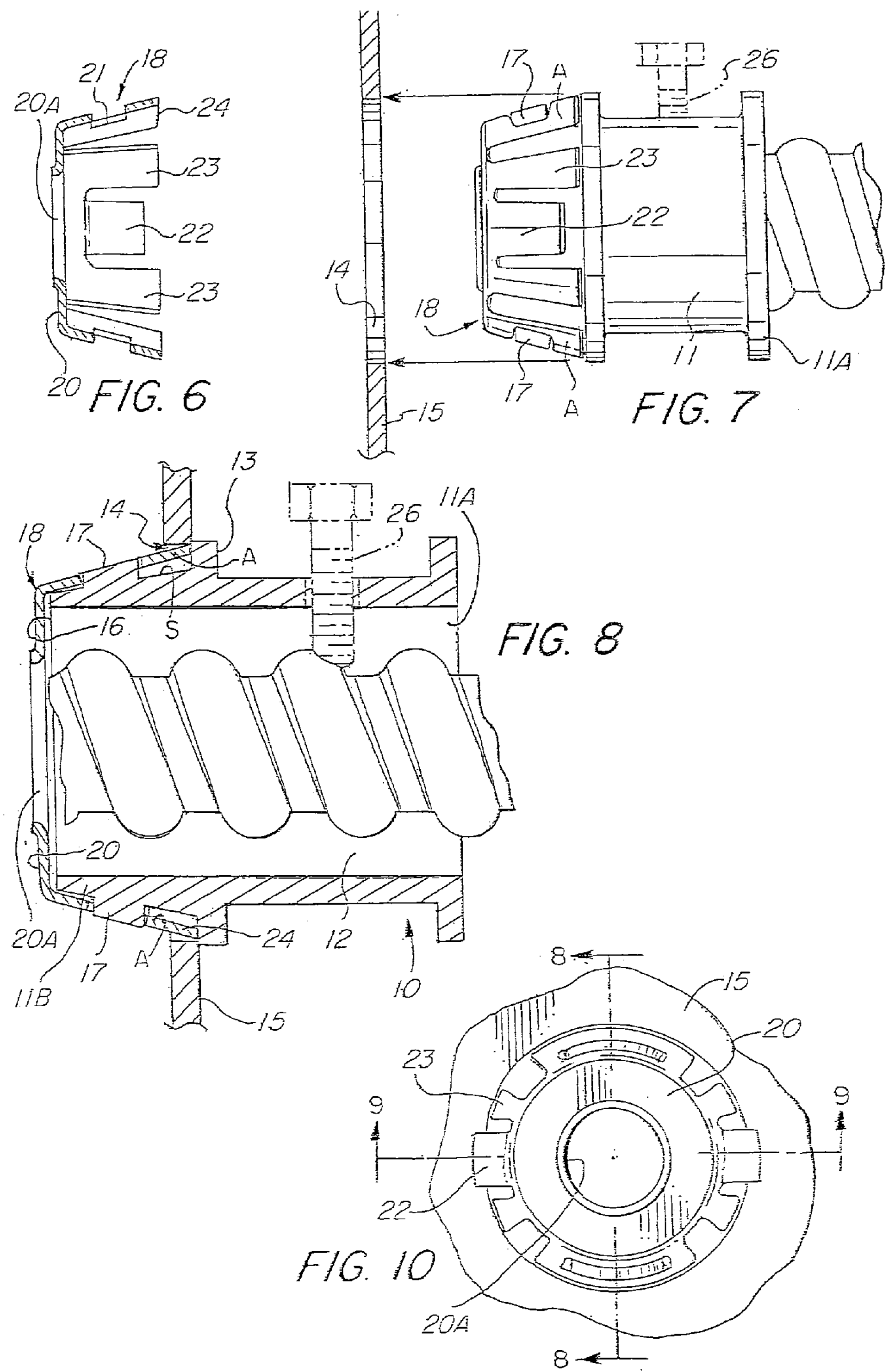
FIG. 6 is a sectional view of the outer retainer ring taken along line 6—6 on FIG. 3.
FIG. 7 is a side view of the connector assembly illustrating the alignment thereof relative to the knockout opening of an electric box.
FIG. 8 is a section side view illustrating the connector assembly secured to an electric box, taken along line 8—8 on FIG. 10.
FIG. 10 is a fragmentary front view of the connector assembly secured to an electric box as viewed from the inside of the electrical box.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

Figure 2:
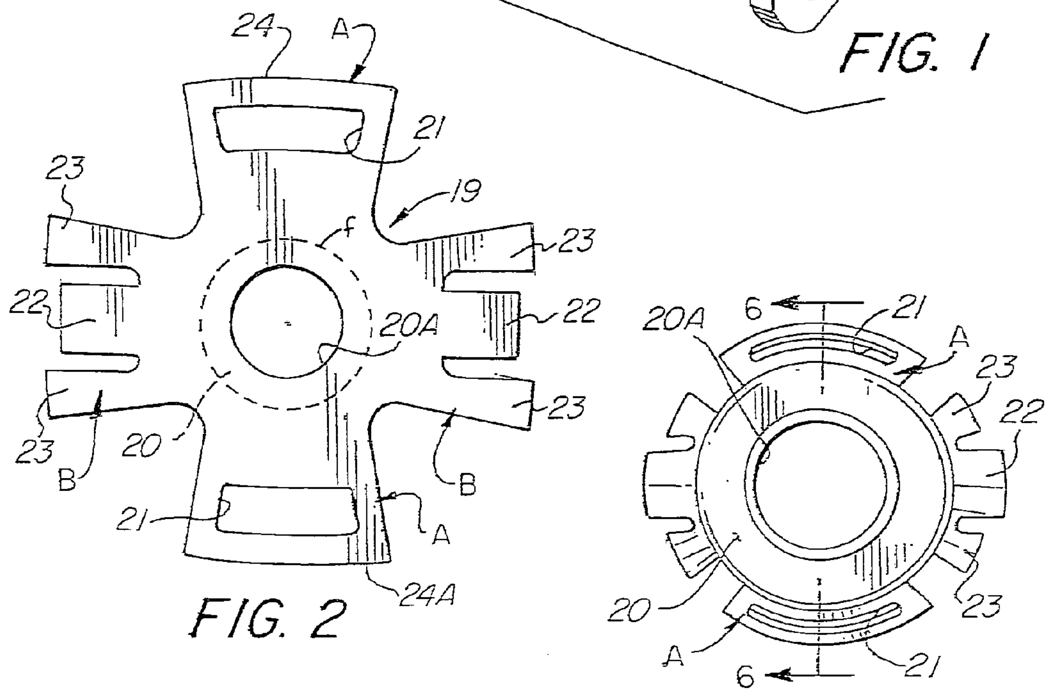
FIG. 2 is a plan view of the blank from which the outer retaining ring of the present invention is formed.
Figure 3:
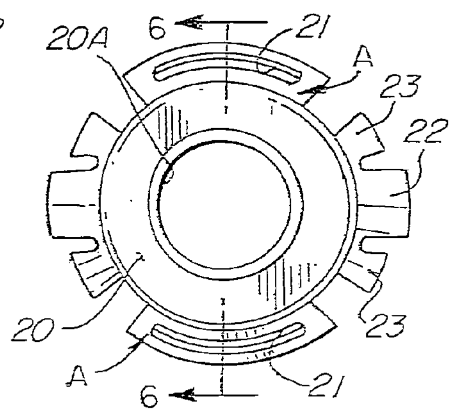
FIG. 3 is a detail front view of the outer retainer ring.
Figure 5:
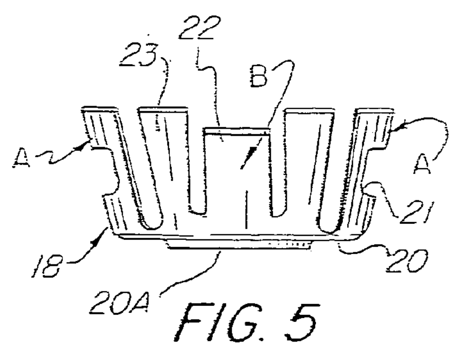
FIG. 5 is a detail end view of FIG. 4.
Figure 4:
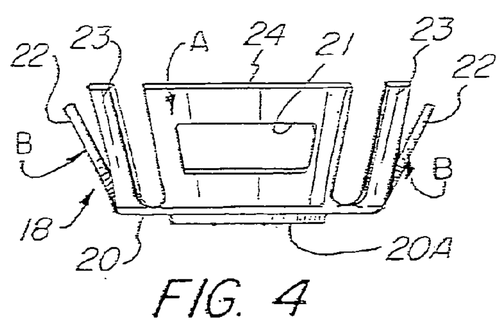
FIG. 4 is a detail top plan view of the outer retainer ring.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

Figure 9:
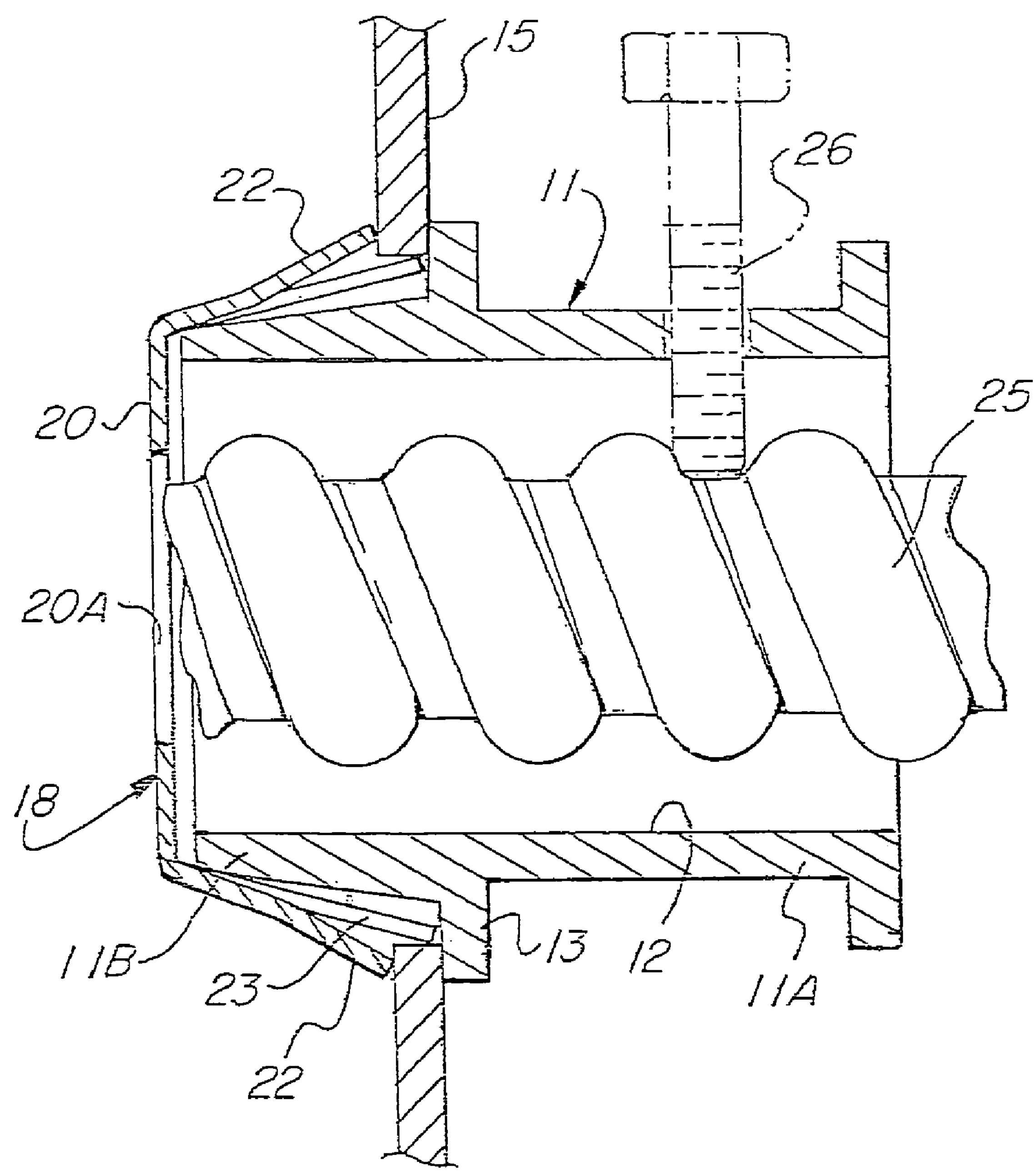
FIG. 9 is a sectional side view taken along line 9—9 on FIG. 10 and rotated 90°.

As illustrated in FIG. 2, the opposed pair of arms A,A are each provided with a retaining slot 21. The opposed pair of arms B,B, as best seen in FIG. 8, are blanked or formed to define a locking tang 22 and to either side thereof an electrical grounding tang 23, 23. As shown, the locking tang 22 is slightly shorter than the adjacent grounding tangs 23, 23. The arrangement is such that the free end of the locking tangs 22 are formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends of the grounding tangs 23 are biased in engagement with the internal periphery of the knockout hole 14. Also, the free ends 24, 24 of arms A,A in the assembled position will also function as electrical grounding tangs, as noted in FIG. 8.

In forming the retaining ring 18 from blank 19, the respective arms A,A and B,B are subjected to a series of progressive bending dies which will gradually bend the respective arms about a foldline f, which defines the face or front portion 20, whereby arms A,A and B,B form a cup having circumscribing frustro-conical or outwardly flaring sides to define a frustro conical ring 18 which complements the conical surface S of the leading or outlet end portion 11B, as seen in FIG. 1. In doing so, the locking tangs 22 are outwardly and cantileverly bent or displaced relative to the surface of the ring at a slightly greater outwardly angle or slope than the adjacent grounding tangs 23 and the slope of arms A,A. With the retaining ring 18 so formed, it can be readily fitted onto the outlet end portion 11B whereby the inherent resiliency of the arms A,A will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms A,A free of the retaining lugs 17.

With the retainer ring 18 properly secured to the outlet end 11B of the connector body 11, the connector assembly 10 can be readily secured to an electric box 10 by simply aligning the assembly 10 with a knockout hole 14, as best seen in FIG. 7, and inserting the leading or outlet end portion into the knockout hole 14 until the flange 13 engages the outer side of the electric box 15. In doing so, the tangs 22, 23 and the free ends 24 of arms A,A, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free end 24 of arms A,A are normally biased in engagement with the internal periphery of the knockout hole 14 to ensure a positive electrical ground with the electric box 15. The engagement of the free ends 24 of arms A,A against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other forms of securing means may be used, than the set screw 26 illustrated.

From the foregoing, it will be apparent that the disclosed connector assembly is quite novel and simple in construction. The snap fit retaining ring 18 can be simply formed from a cruciform shaped blank 19 whereby the opposed radially extending arms A,A and B,B can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

Figure 11:
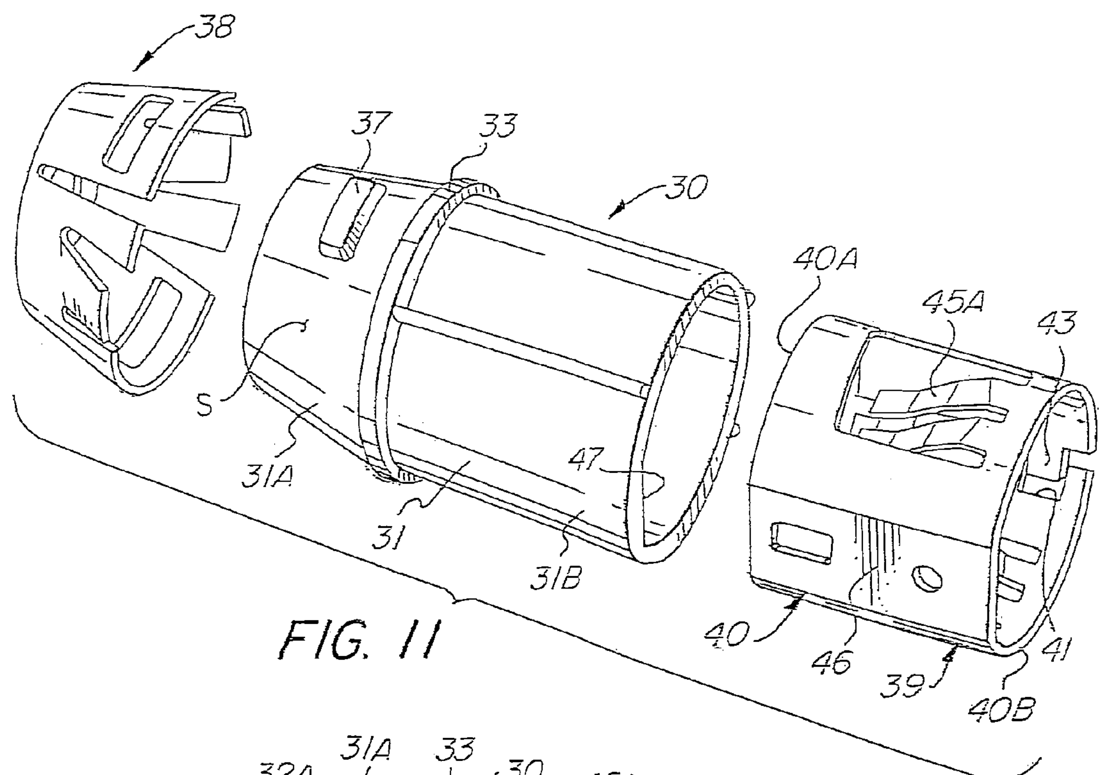
FIG. 11 is an exploded perspective view of a modified form of the invention.
Figure 12:
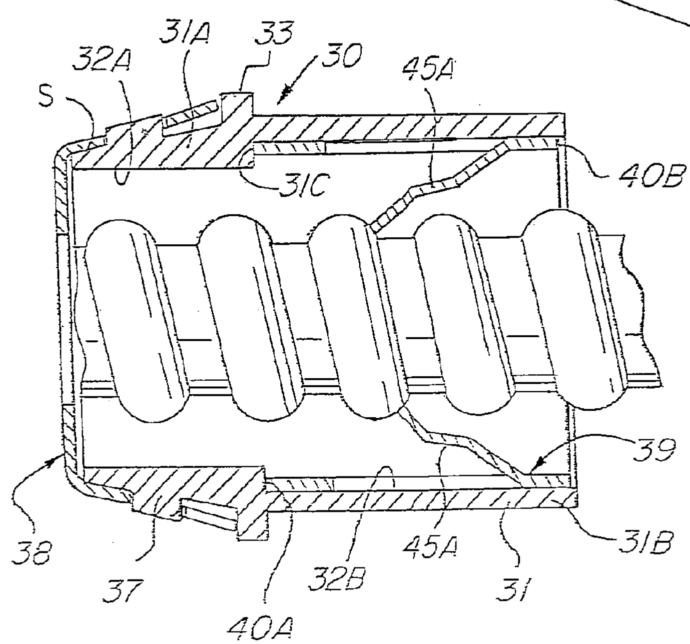
FIG. 12 is a sectional side view of the modified form of the invention of FIG. 11.

FIG. 11 illustrates a perspective view of a modified form of the invention. As illustrated in FIG. 11, the connector assembly 30 includes a connector body 31 which may be formed as a casting form of a suitable metal or alloy, e.g. zinc and the like, as hereinbefore described. The connector body 31 includes a conically shaped outlet end 31A similar to that described with respect to FIG. 1, and a cylindrical inlet end 31B. A circumscribing internal shoulder 31C is formed intermediate the opposed ends of the connector body 31. As shown in FIG. 12, the internal shoulder 31C defines the demarcation between the bore 32A defining the outlet end 31 and the bore 32B defining the bore of the inlet end. Circumscribing the connector body 31 about the exterior thereof is a radially outwardly extending stop flange 33.

The outlet end 31A of the connector body 30 is provided with opposed retaining lugs 37 adjacent the outlet opening 36. Circumscribing the sloping or conical surface S of the outlet end 31A is the outer retaining ring 38, similar to that hereinbefore described with respect to FIGS. 1 to 10.

In the embodiment illustrated in FIG. 11, the connector assembly 30 includes an internal wire retainer 39 in the form of a ring, cylinder or sleeve which is fitted to the bore 32B of the connector body 31, and which retainer 39 functions as a unidirectional retainer means arranged to permit a wire conductor to be readily inserted and secured thereinto, and which will resist any applied force imparted to the wire conductor in the opposite direction to prohibit any unintentional separation of the wire conductor from the connector body 31. Wire conductor, as used herein, means any wire, cable, helical wound metal covering or sheath (BX) wire, plastic sheath wire conductor and the like.

Figure 13:
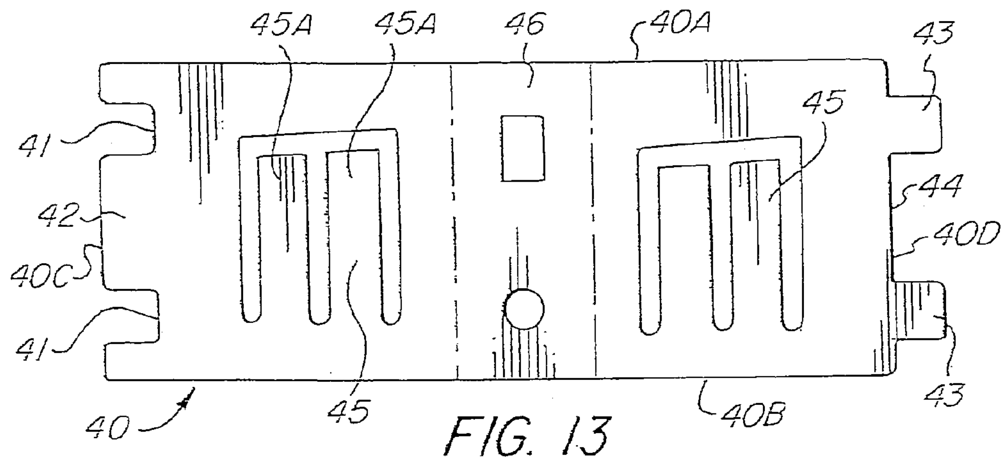
FIG. 13 is a top plan view of the blank from which the internal wire conductor retainer is formed.
Figure 14:
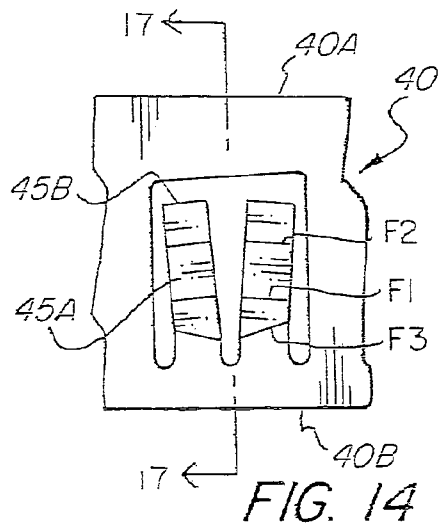
FIG. 14 is a fragmentary top view of a portion of the blank forming the inner retainer sleeve or ring.
Figure 15:
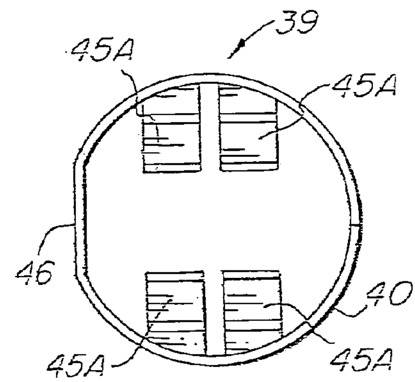
FIG. 15 is an end view of the inner wire conductor retainer ring or sleeve.
Figure 17:
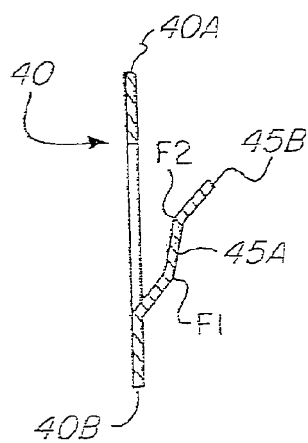
FIG. 17 is a section view taken along 17—17 on FIG. 16.

Referring to FIGS. 13 to 15, the internal retainer 39 is preferably formed from an elongated blank 40 of spring steel. The retainer blank 40, as best seen in FIG. 13, comprises an elongated generally rectangular blank having a longitudinal leading edge 40A, a trailing edge 40B and opposed end edges 40C and 40D. End edge 40C is provided with a pair of spaced apart notches 41, 41 and a projecting tongue 42. The other end edge 40D of blank 40 is provided with a pair of projecting tongues 43, 43 arranged to complement notches 41, 41 and a complementary notch 44 for receiving tongue 42 in the formed or rolled position of the retainer sleeve 39, as shown in FIG. 18.

Blanked, lanced, cut or stamped out of the plane of blank 40 are one or more tangs 45. In the form of the invention as shown in FIG. 13, tangs 45 are formed out of the plane of the blank. The respective tangs 45 are bifurcated to define a pair of finger tangs 45A, 45A longitudinally spaced along the longitudinal axis of the blank 40 at a distance, which, when the blank 40 is rolled to form the retainer sleeve 39, the respective pairs of finger tangs 45A are oppositely disposed, as best seen in FIG. 15.

Figure 18:
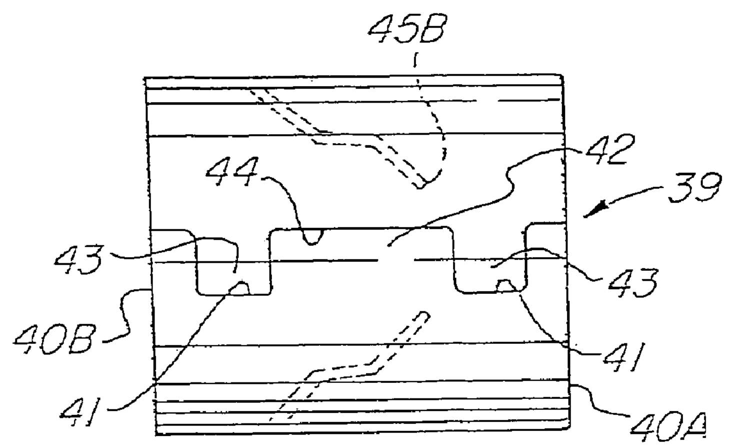
FIG. 18 is a side view of the inner retainer ring or sleeve.

As shown in FIGS. 15 and 18, the respective finger tangs 45A, 45A are inwardly bent out of the plane of the retainer sleeve 39. In the illustrated embodiment, the respective finger tangs are provided with a pair of intermediate transverse fold lines $F_1$ and $F_2$ whereby the free end of the respective finger tangs is directed toward the longitudinal axis of the sleeve 39, as shown in FIG. 18.

Referring to FIG. 15, it will be noted that the retainer sleeve is provided with a flattened portion 46 on one side thereof.

The connector body of FIGS. 11 and 12 may be formed with an internal complementary flat surface along a portion of the inner circumference thereof. The arrangement is such that the retainer sleeve 39, when inserted into the inlet end 31B of the connector body, is oriented so that the flattened surface 46 of the sleeve 39 complements the internal flattened surface 47 of the connector body. The orientation is such that the opposed finger tangs 45A are oppositely disposed to firmly grip the wire conductors, e.g. an armored conductor or other covered conductor.

The outer circumference of the inner retainer sleeve or ring 39 is proportioned so that it can be press fitted or frictionally fitted into the inlet end 31B of the connector body 31 by a force sufficient to firmly secure the inner retainer ring or sleeve 39 within the inlet end so as to prohibit any separation of the retainer ring or sleeve 39 from the inlet end of the connector body. The complementary flattened surfaces 46 of the internal sleeve 39 and 47 of the inlet end of the connector body insures proper orientation of the internal sleeve 39 within the inlet end of the connector body.

Figure 16:
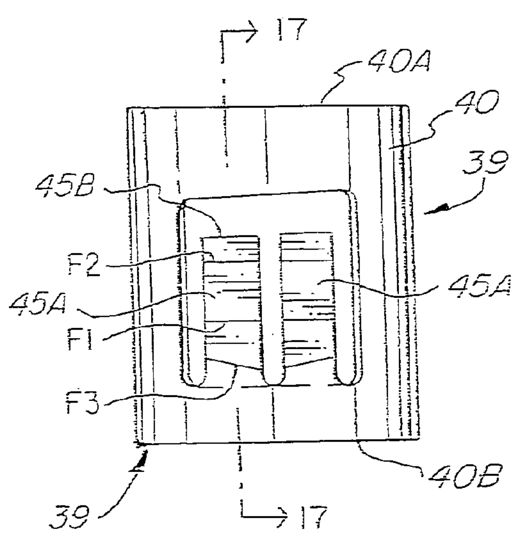
FIG. 16 is a top view of the inner retainer ring or sleeve of FIG. 15.

FIG. 14 illustrates a fragmentary portion of the blank 40 to show an intermediate step in forming the tang fingers 45A, 45A so that when the formed blank 40 is rolled to form the internal retaining sleeve, the tang fingers will be disposed in parallel as seen in FIGS. 15 and 16. This is attained by fold line $F_3$ which is disposed at an angle, as noted in FIG. 14, so that when the blank is rolled to form the internal retaining sleeve 39, the tang fingers 45A, 45A will be disposed in parallel. The free ends 45B of the respective fingers 45A are angularly offset to engage the grooves of an armored conductor, as noted in FIG. 12 or other covering sheath of a wire conductor that will resist a force attempting to effect separation of the conductor from the connector assembly. The respective free ends 45B may also be laterally offset so that an armored conductor may be threadedly connected to the internal sleeve 39, as well as by simply inserting the armored covered conductor into the retainer sleeve to effect a snap fit connection.

Figure 19:
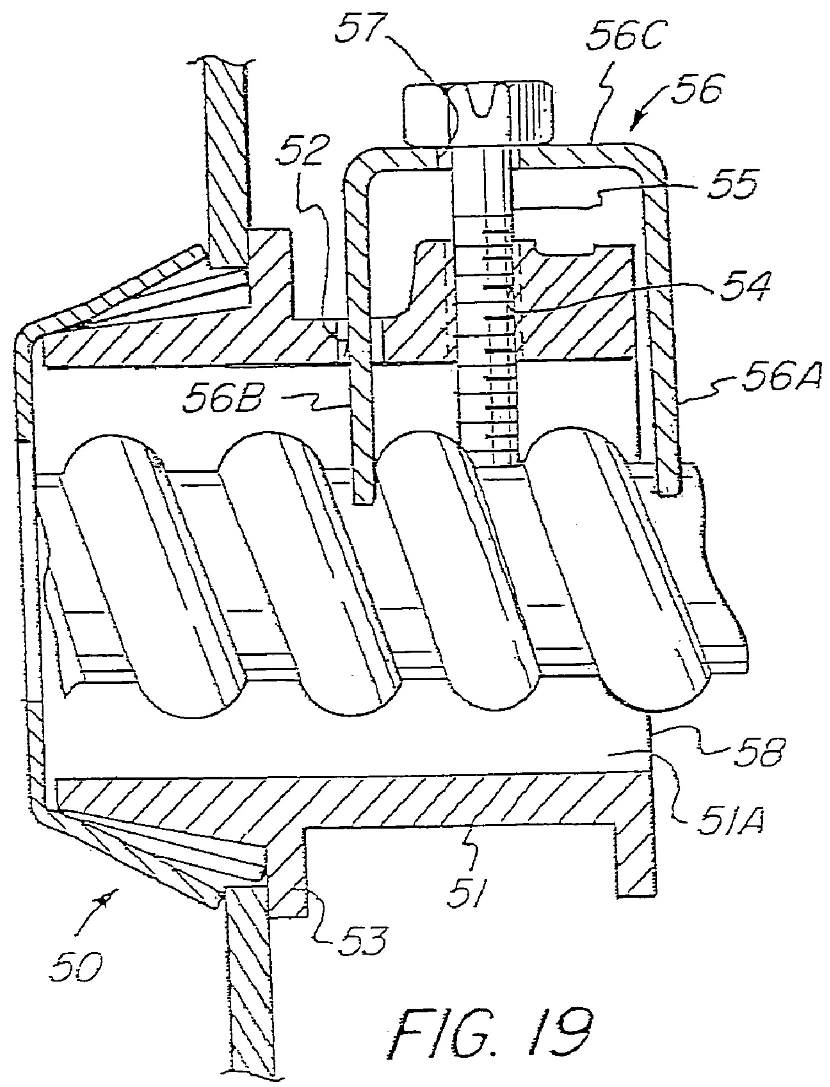
FIG. 19 is a sectional side view of still another embodiment.

FIG. 19 illustrates a further embodiment of the invention. The embodiment of FIG. 19 is directed to a connector assembly 50 which is generally similar to that disclosed in FIGS. 1 to 10. The embodiment of FIG. 19 differs from that disclosed in FIGS. 1 to 10 and FIGS. 11 to 18 in that the connector body 51 is provided with a slotted opening 52 in the inlet end 51A thereof positioned adjacent to the radially outwardly extending flange 53. Intermediate between the inlet end 51A and the flange 53, the inlet end is provided with a tapped or threaded hole 54 for receiving a set screw 55.

In this form of the invention, the wire retainer means comprises an inverted U shape clamp 56 having opposed leg portions 56A, 56B and an interconnected web 56C. The web 56C is provided with an aperture or hole 57 arranged to be disposed in alignment with the tapped or threaded hole 57. The web 56C is sufficiently wide so that one leg, e.g. leg 56B, is extended through the slotted opening 52 and the other leg 56A extends over the inlet opening 58 to the inlet end portion 51A. The retaining clamp 56 is adjustably secured to the connector body 51 by the set screw 55 extending through the aligned tapped hole or screw hole 52. By having one leg 56B extending through the slotted opening 52 and the other leg 56A extending over the inlet opening 58, the clamp 56 can be readily adjusted relative to the connector body by turning the set screw 18 in one direction or the other. The arrangement is such that as the set screw 55 is tightened, the opposed and spaced apart free ends of the respective clamp legs 56A, 56B will exert a bearing force on the wire conductor sheath to positively secure a wire conductor to the inlet end of the connector assembly. In all other respects, the connector assembly of FIG. 19 is similar to that disclosed in FIGS. 1 to 10, and need not be repeated.

Figure 20:
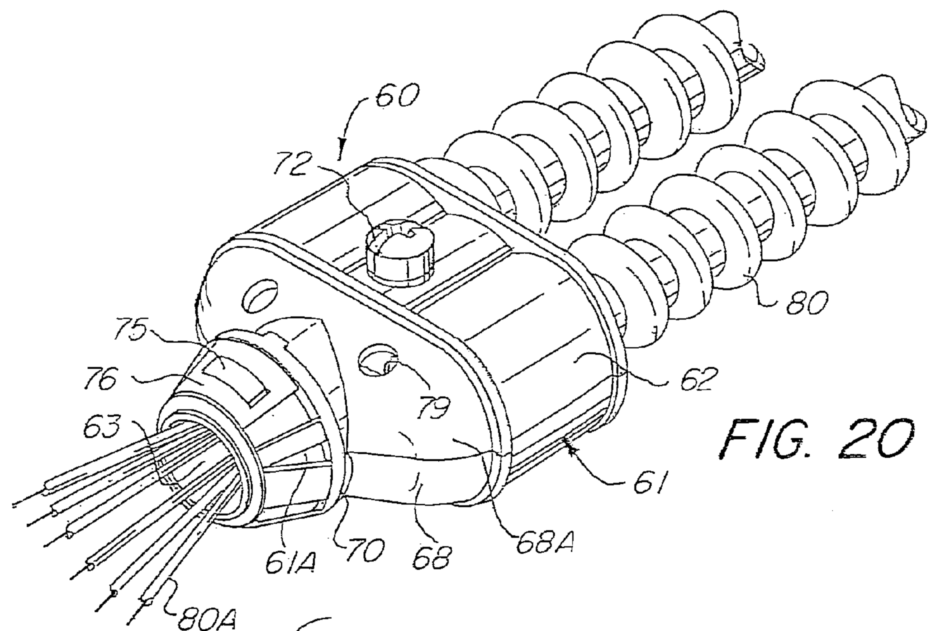
FIG. 20 is a perspective view of a further embodiment of the invention.
Figure 21:
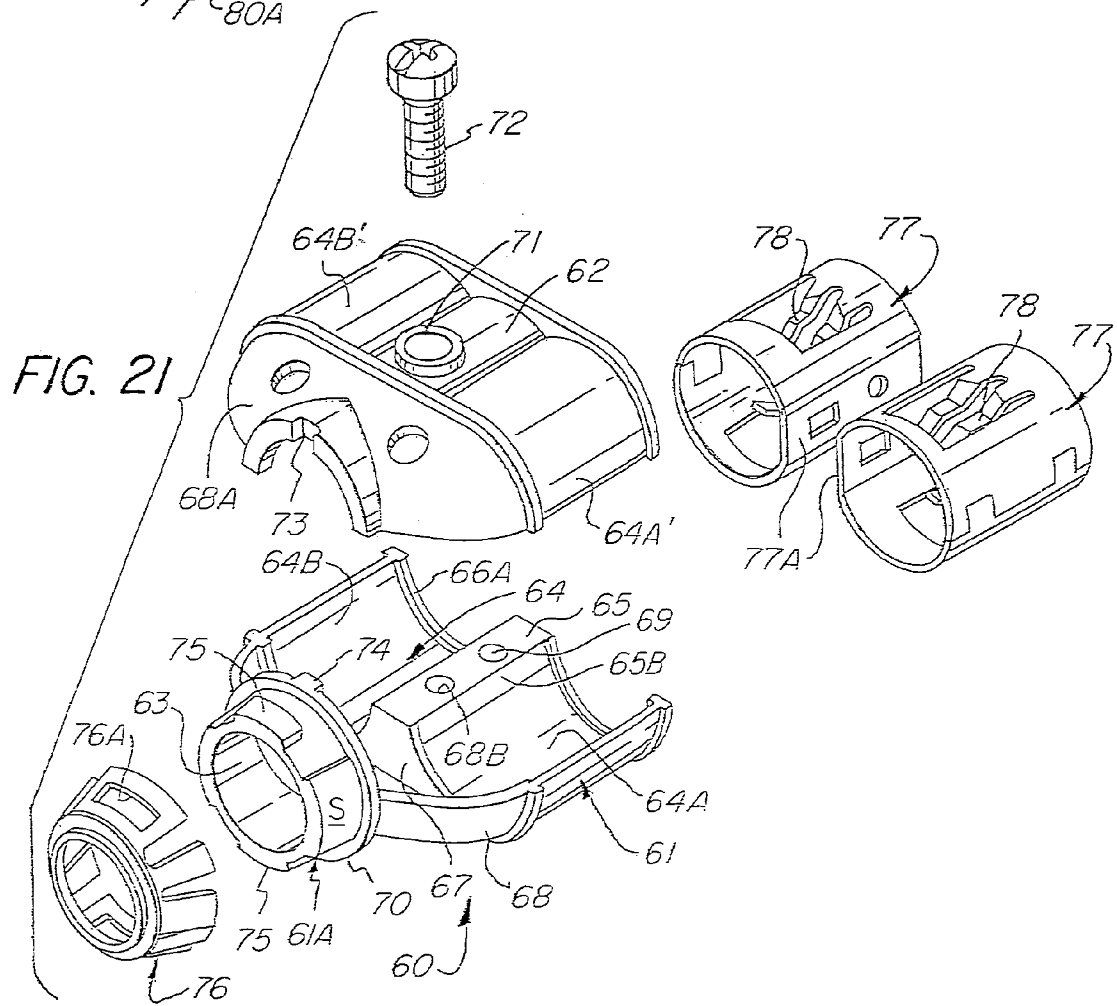
FIG. 21 is an exploded perspective view of the embodiment of FIG. 20.

FIGS. 20 to 32 are directed to a further modification of the disclosed invention. As best seen in FIGS. 20 and 21, the connector assembly 60 includes a housing or connector body formed of a pair of complementary sections or members 61 and 62. The respective complementary sections or members 61 and 62 are preferably formed as casting of any suitable metal or alloy material, e.g. zinc, aluminum and the like.

As best seen in FIG. 21, one of the housing complementary members, e.g. 61, is provided with a projecting leading or outlet end 61A, which is adapted to be inserted through a knockout hole 14 of an electric box or panel 15. The leading or outlet end 61A is formed with an annular configuration to define an outlet opening 63, through which the conductor leads or wires 80A may extend as noted in FIG. 20. The outer surface S of the leading end 61A slopes or tapers downward toward the central axis of the connector assembly to define a frustro conical outer surface S on the leading end 61A.

The complementary member 61 also includes a trailing or inlet end 64. As shown in FIG. 21, the trailing or inlet end 64 is formed as a pair of semi-cylindrical chambers 64A, 64B disposed in parallel side by side arrangement separated by an intermediate wall or division 65. The opposed ends of the respective chambers 64A, 64B are defined between an inturned lip 66A circumscribing the inlet opening 66 to the respective chambers 64A, 64B and a transverse web 67. A transition section 68 connects the respective chambers 64A–64B to leading or outlet end 61A.

Extending through the intermediate wall 65 is a tapped hole 68B having internal threads. Also formed on the wall 65 is an aligning depression or recess 69. Circumscribing the leading or outlet end 61A is a radially outwardly extending flange 70 which functions as a stop to limit the distance the connector assembly 60 can be inserted through a knockout opening 14 of an electric box or panel 15.

Figure 31:
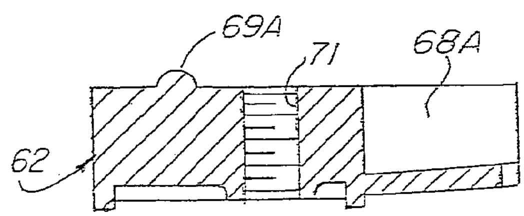
FIG. 31 is a sectional view taken on line 31—31 on FIG. 30.
Figure 32:
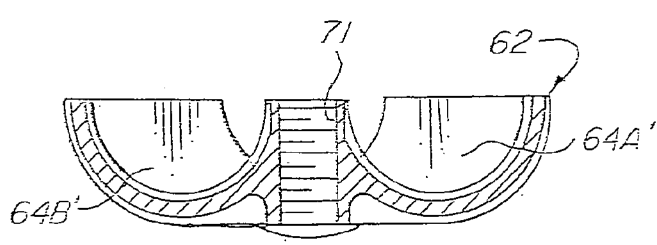
FIG. 32 is a sectional view taken on line 32—32 on FIG. 28.

The complementary housing section or member 62 is formed with a pair of semi-cylindrical chambers 64A', 64B' disposed in parallel relationship and arranged to complement chambers 64A, 64B in the assembled position of the respective housing members 61, 62, as best noted in FIGS. 20 and 31. Housing member 62 is provided with a hole 71 extending therethrough which is arranged to be disposed in alignment with the tapped hole 68B whereby the respective housing sections 61, 62 can be secured in the assembled position by a threaded fastening screw 72 inserted through hole 71 and threaded into the tapped hole 68 of the other housing member 61. Housing member 62 is also provided with a transition section 68A that complements transition section 68 of the other housing member or section 61.

To facilitate the alignment of the two housing sections 61 and 62 in assembling the sections 61, 62, there are provided complementary aligning means. In the illustrated embodiment, the aligning means comprises a notch 73 formed at the leading end of the housing member 62 which is arranged to mate with a complementary projection or lug 74 formed on the outlet end portion of the housing member 61. Another alignment means includes a recess or depression 69 formed in the dividing wall 65 of housing member 61 arranged to be disposed in alignment with the projection or dimple 69A formed on the dividing wall 65A of housing member 62.

In this form of the invention, the outlet or leading end 61A is provided with retainer lug 75 projecting outwardly from the conical surface S of the outlet end 61A. In the illustrated embodiment, two such retaining lugs 75 are oppositely disposed. Disposed about the outer sloping or tapered surface S of the outlet end 61A is a frustro-conical retainer ring 76. The conical retaining ring 76 is formed and constructed in the manner hereinbefore described with respect to FIGS. 2 to 4 and need not be repeated. As seen in FIGS. 20 and 21, the frustro conical external retainer ring 76 can be readily slipped onto the outlet end 61A so that upon engagement of the retainer lugs 75 with the complementary slots 76A formed on the retainer ring 76, the retainer ring 76 is maintained in position on the external surface S of the leading or outlet end 61A as hereinbefore described.

In this form of the invention, a wire conductor retainer ring or sleeve 77 is arranged to be disposed and clamped between the complementary chambers defined by the respective housing sections or members 61, 62 when assembled. The respective wire retainer rings or sleeves 77 are similar in construction and function to that described with respect to FIGS. 13 to 16, which need not be repeated. It will be noted that dividing wall 65, 65A of the respective housing members 61, 62 are arranged to engage the flat area 77A of the respective wire retainer sleeves 77 thereby functioning as a means for effecting proper orientation of the respective wire retainer sleeves 77 within their respective chambers in the assembled position of the housing sections or members 61, 62.

Figure 22:
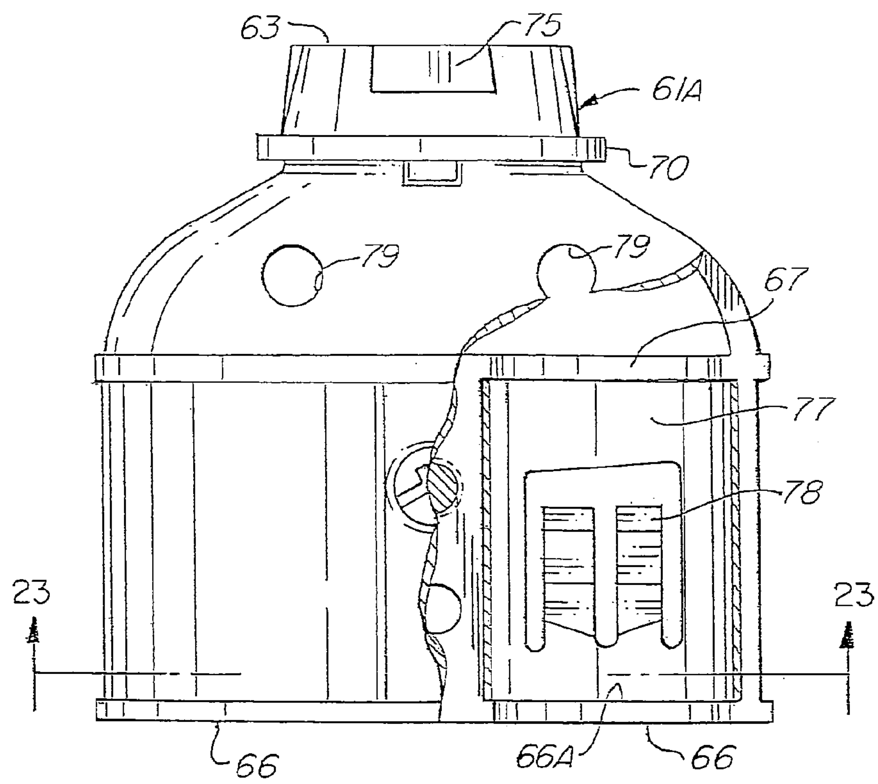
FIG. 22 is a top plan view of the embodiment of FIG. 20 having parts thereof broken away.
Figure 23:
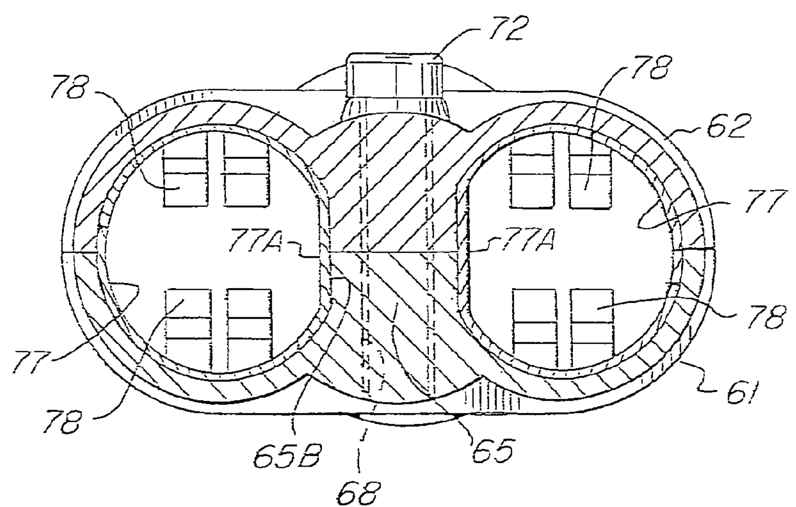
FIG. 23 is a sectional view taken along line 23—23 on FIG. 22.
Figure 28:
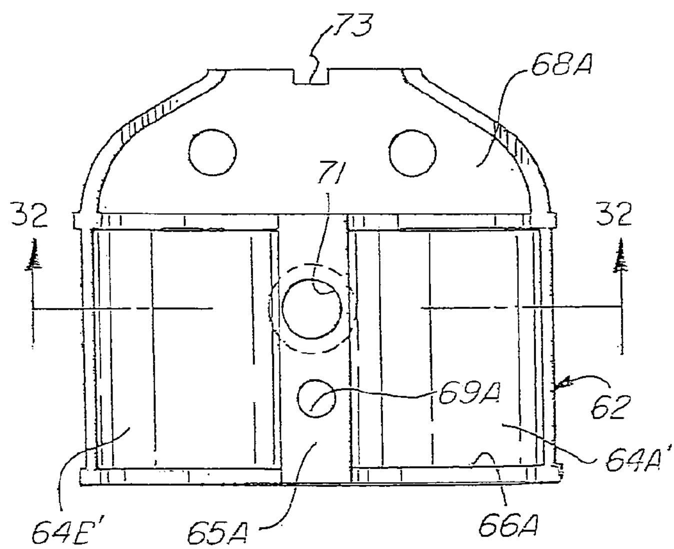
FIG. 28 is an inside plan view of the complementary housing section of the embodiment illustrated by FIG. 20.
Figure 29:
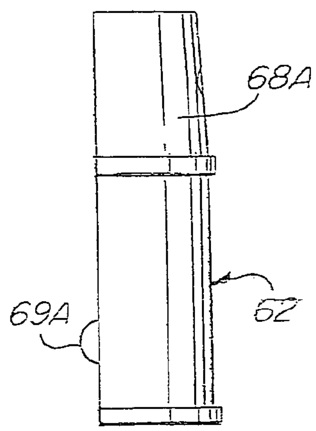
FIG. 29 is an end view of FIG. 28.
Figure 30:
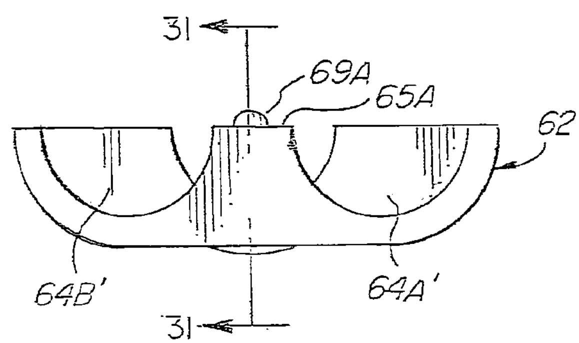
FIG. 30 is an inlet end view of FIG. 28.

To assemble the connector 60 of FIGS. 20, 21, a formed conductor wire retainer ring 77 as hereinbefore described, is position in each semi-cylindrical chamber defined in one of the housing sections, e.g., as illustrated in FIGS. 21 or 22; noting that the flat portion 77A of the respective wire conductor retainer sleeves 77 are positioned against the adjacent opposing surfaces 65B of the dividing wall 65, as best seen in FIG. 23. In this position, the opposite ends of the respective sleeves 77 abut the interior lip 66A adjacent the inlet opening and the transverse web 67. With the wire retainer rings 77 thus positioned within their respective chamber, the other housing member, e.g. member 62, is fitted to housing member 61 whereby the respective housing sections clamp the respective wire retaining sleeves 77 therebetween as the fastening screw 72 is rotated to secure the two housing sections together as shown in FIGS. 20 and 23. It will be noted that the outer diameter (OD) of the wire retainer sleeves 77 are substantially equal to or slightly greater than the internal diameter of the respective chambers in the assembly position of the housing sections 61, 62, as noted in FIGS. 20 and 23. The arrangement is such that the respective retainer sleeves 77 are firmly secured within their respective chamber, when assembled, so that the wire retainer sleeves are prohibited from being separated from the connector body or housing. With the housing members 61, 62 thus secured, the external retainer ring 76 can be readily fitted onto the leading end 61A of the connector body or housing, as hereinbefore described.

With the connector body of FIG. 20 thus assembled, it will be noted that the connector assembly 60 can be readily secured to an electric box or panel simply by inserting the leading or outlet end 61A through a knockout hole of a panel or electrical box so as to be readily secured thereto with a snap fit as hereinbefore described. Also with the arrangement described, a wire conductor or cable can be readily attached to the trailing end of the connector assembly 60 with a simple snap fit.

FIG. 20 illustrates a wire conductor having an external helically wound sheath or outer covering 80 which can be readily inserted through the inlet opening of one of the respective chambers formed in the trailing end whereby the gripping tangs 78 formed in the wire retainer sleeves 77, as hereinbefore described, securely grips the armored cable or wire conductors with a snap fit, the arrangement being such that the wire so secured is prohibited from becoming accidentally separated from the connector body, as hereinbefore described. While a conventional armored type conductor 80 is illustrated in FIG. 20, it will be understood that the described connector assembly herein can be suitable for use with other types of wire conductors, e.g. conductors having an external plastic or fabric like sheath.

By simply removing the single fastening 72, the entire assembly can be readily taken apart to effect the separation of the wire conductor if so desired. If desired, the transition portions 68, 68A of the respective housing sections 61, 62 may be provided with peep holes 70 to view the individual conductor wires 80A arranged within the connector body to facilitate an electrical installation.

From the foregoing, it will be noted that the connector assemblies disclosed herein utilize a frustro conically shaped outer retainer ring which is uniquely secured to the leading end of a connector body, with securing tangs and grounding tangs arranged to effect both a positive securement of the connector assembly to a knockout hole of an electric box or panel and a positive electrical ground. In association with an external frustro conical retaining ring, other disclosed embodiments include a trailing end constructed to receive one or more wire conductors and retaining the same to the connector body with a simple snap fit motion. While the embodiment of FIG. 20 has been illustrated and described as having a duplex trailing end portion, it will be understood that the subject matter described can be utilized with one or more chambers formed in the trailing end of the connector body described herein, depending upon the number of wire conductors one may wish to connect to a single connector body.

With respect to the embodiment of FIGS. 20 to 32, the arrangement is such that the connector body, being formed of two component housing sections, and secured together with a fastener as described imparts a clamping force onto the spring steel wire retaining ring or sleeve with a surface to surface contact to enhance electrical conductivity or grounding between the component housing sections, and the wire retaining sleeves clamped therebetween.

FIGS. 33 to 44 illustrate a further modification of the invention. In this embodiment, the connector assembly 80 includes a connector body 81, an outer frustro conical external snap-fit retainer ring 82, a wire retainer device 83, and an optional plastic electrical insulating end ring insert 84.

Figures 33, 34, 35, 36, 37:
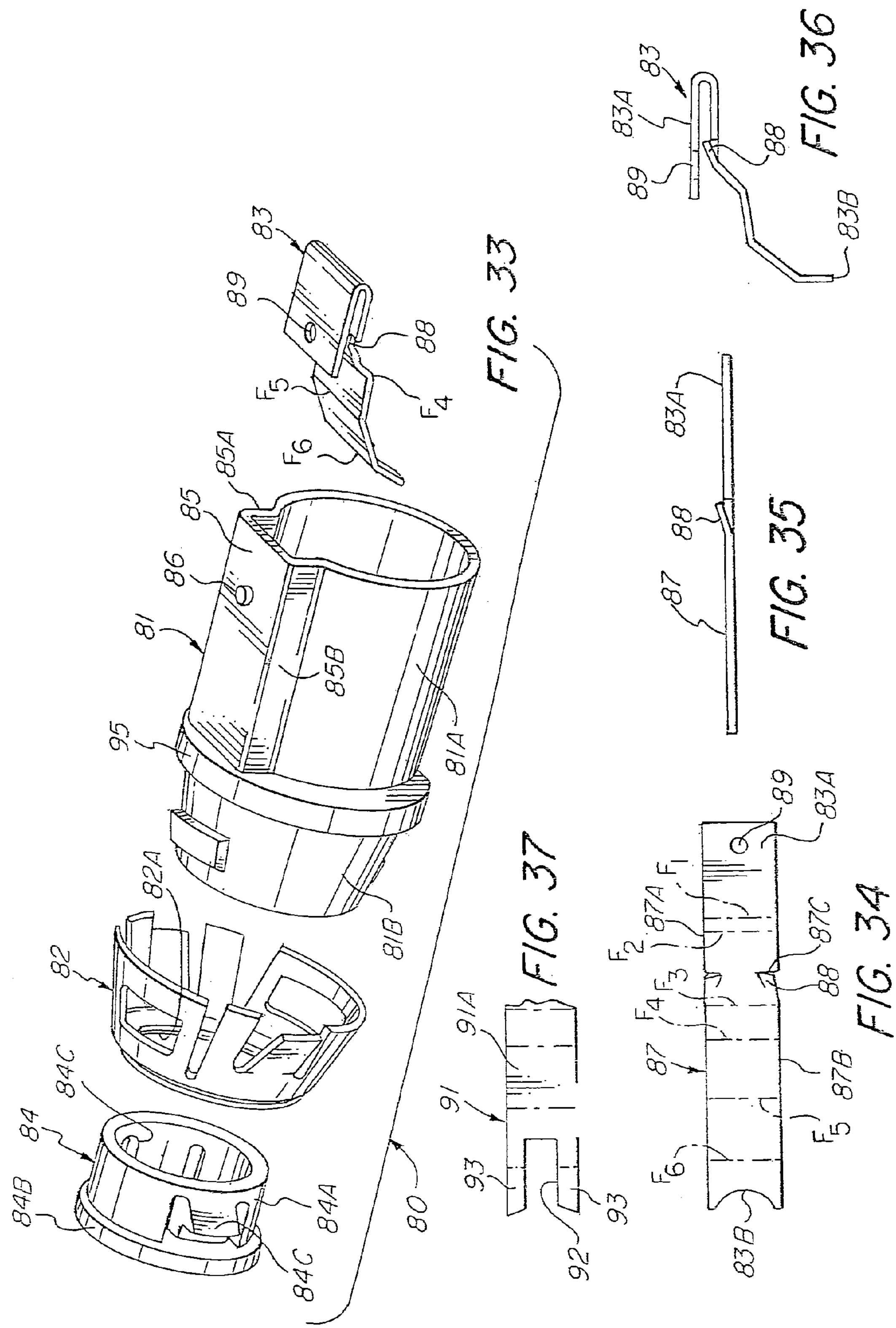
FIG. 33 is a perspective exploded view of a further embodiment of the invention.
FIG. 34 is a top plan view of the blank from which the wire retainer device is formed.
FIG. 35 is a side view of the blank of FIG. 34.
FIG. 36 is a side view of the blank of FIGS. 34 and 35 as formed to define wire retainer.
FIG. 37 is a top view of a slightly modified form of a wire retainer.
Figure 38:
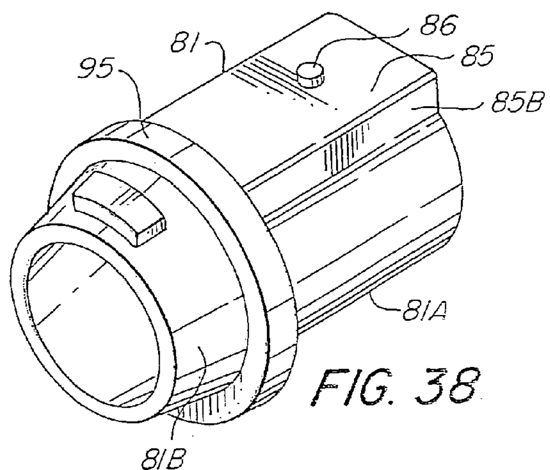
FIG. 38 is a perspective view of the connector body embodying the invention.
Figure 41:
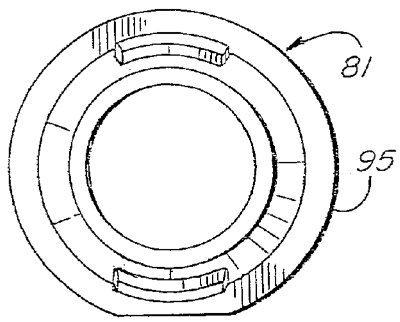
FIG. 41 is a left end view of FIG. 38.
Figure 39:
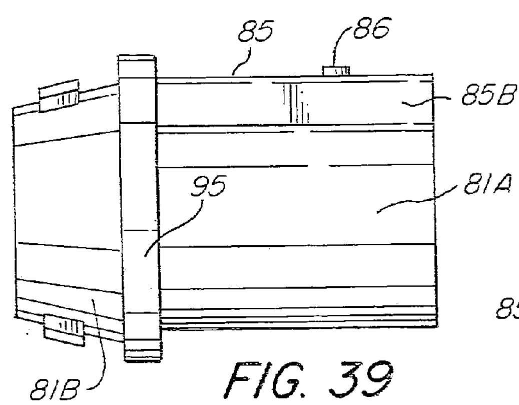
FIG. 39 is a side view of FIG. 38.
Figure 42:
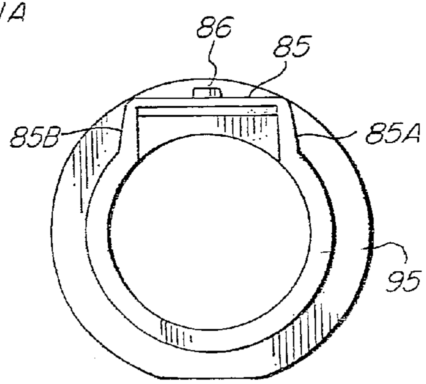
FIG. 42 is a right end view of FIG. 38.
Figure 40:
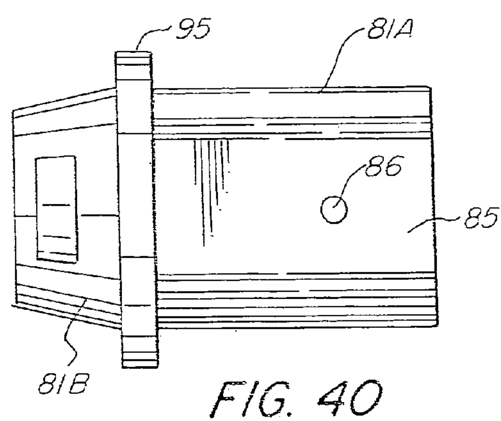
FIG. 40 is a top plan view of FIG. 39.
Figure 43:
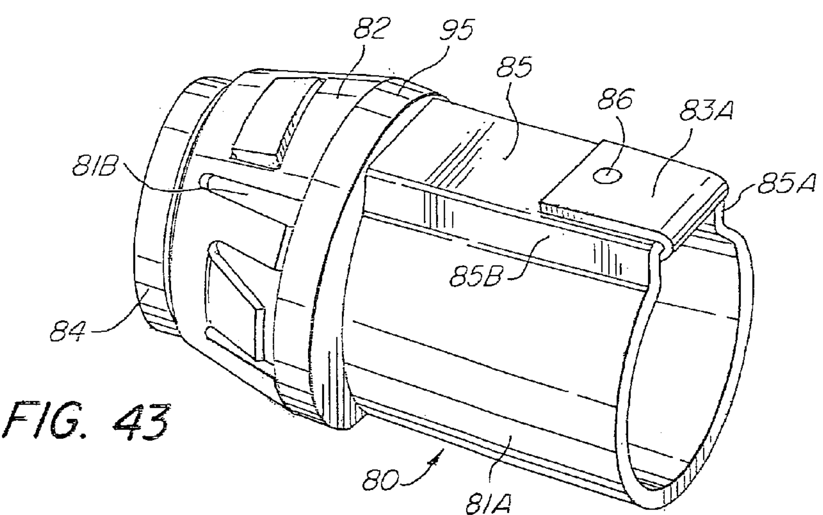
FIG. 43 is a perspective view of the assembled connector embodiment shown in FIG. 33.

As shown, the connector body 81 includes an inlet portion 81A and an outlet portion 81B, formed as a casting of a suitable metal, e.g. zinc or other suitable metal alloy. The inlet portion 81A, for the greater portion thereof, is defined by a cylindrical body having a circumference which is greater than 180°, and preferably about 320° plus or minus a few degrees. The non-curvilinear portion of the cylindrical body defining the inlet end portion 81A, as viewed in FIGS. 33 and 43, is provided with a flat-top surface or closure 85 which is integrally connected to the opposed edges of the cylindrical body by interconnecting opposed side walls 85A and 85B. Projecting outwardly of the flat-top closure 85 is an anchoring pin or boss 86.

The outlet portion 81B comprises a frustro conical end similar to that hereinbefore described with respect to the embodiments of FIGS. 1, 11, 19 and 21. Also, the external snap fit ring 82 adapted to be disposed about the outlet end portion 81B is structurally and functionally similar to that hereinbefore described, and need not be repeated.

Figure 44:
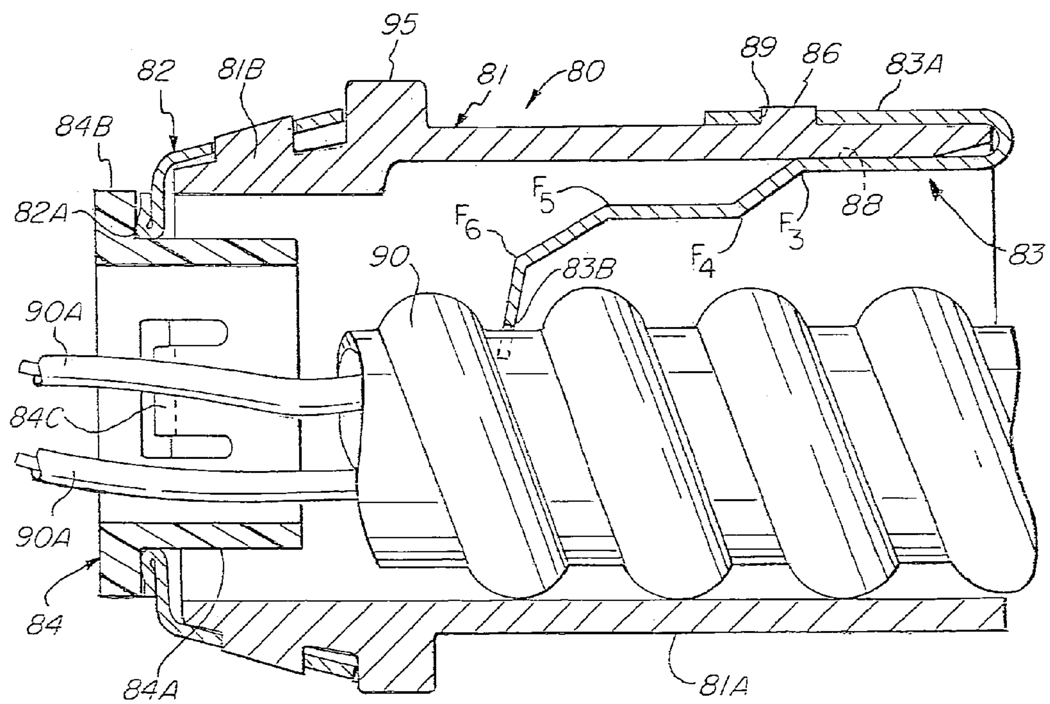
FIG. 44 is a side sectional view of the connector assembly of FIG. 43.
Figure 45:
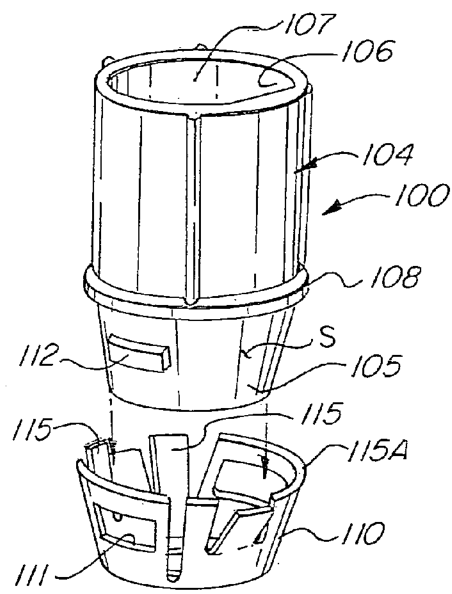
FIG. 45 is an exploded perspective of another modified form of the invention.

In the embodiment of FIGS. 33 and 44, a wire retainer or device 83 is arranged to extend into the inlet portion 81A, whereby a wire conductor 90, adapted to be inserted into the inlet portion 81A, is retained therein merely by inserting the wire conductor into the inlet end portion 81A. The arrangement is such that the wire conductor 90, once inserted into the inlet portion 81A and past the free end 83C of the wire retainer 83, positively retains the wire conductor 90 so as to prohibit any unintentional separation of the wire conductor 90 from the connector body 81, as best seen in FIG. 44.

The wire or conductor retainer 83 is formed from an elongated rectangular blank 87, preferably a blank of spring steel. The blank 87 is provided with a plurality of longitudinally spaced apart transverse foldlines $F_1$ to $F_6$, whereby the blank 87 can be readily formed to define the spring steel retainer 83.

As shown, the elongated blank 87, intermediate the length thereof and adjacent the longitudinal edges 87A, 87B, is provided with die cut or slit 87C to form opposed projecting prongs 88 that are bent out or project beyond the plane of the blank 87. The right end of the blank 81, as seen in FIG. 35, is reversely bent or folded about foldlines $F_1$ and $F_2$ so as to overlie the projecting prongs 88, as best seen in FIG. 36, whereby the reversely bent end 83A is spaced above the projecting prongs 88. Formed in the bent end 83A is an aperture or hole 89 which is positioned to receive anchor pin or boss 86 in the assembled position. The portion of the blank 87 to the left of the prongs 88 are bent about transverse foldlines $F_3$, $F_4$, $F_5$ and $F_6$ at longitudinally spaced intervals to configure the blank 87 with a series of angular bends, as shown in FIG. 36. The angle of respective bends about the respective foldlines $F_3$ to $F_6$ is not critical and may vary depending upon the internal diameter of the inlet end 81A. As shown in FIG. 44, the retainer device 83 may be angularly bent so that the free end 83B extends to a position sufficient to engage the wire conductor or the wire covering or sheath 90, as noted in FIG. 44.

In the illustrated embodiment, the wire conductor, as shown, includes a typical helically wound metallic sheath or covering 90 that houses the conducting insulated wires 90A. To facilitate the retention of the sheath 90, the free end of the retainer device 83 may terminate in a curvilinear arc 83B to complement the circumference of the sheath 90 disposed between the adjacent helical ridges as best seen in FIG. 44.

To assemble the wire retainer 83 to the inlet portion 81A of the connector body 81, the reversely bent end portion is fitted to or clipped onto the end of the flat closure or top 85, as best seen in FIGS. 43 and 44 so that the anchoring pin 86 is received in the hole 89. To secure the retainer device 83 to the connector body 80, the top of the anchor pin is swedged so as to deform the end of the anchor pin 86, whereby the deformation of the anchor pin 86 firmly and fixedly secures the retainer device 83 to the connector body. In the swedging operation, the prongs 88 formed in the blank 87 are caused to "bite" into the under surface of the flat closure or top 85, as best seen in FIG. 44, to enhance the attachment of the retainer device 83 to the connector body 81. To complete the assembly of the connector assembly, the frustro conical external ring 82 is snap fitted onto the conically formed outer end portion 81B as hereinbefore described. While the means for securing the wire retainer 83 to the connector body portion 81A is described by means of a swedged pin, it will be understood that other suitable fastening means may be used, e.g. screws, bolts, welding, solder and the like.

As will be best noted in FIG. 44, the retainer device is so formed that the free end 83B is arranged to extend into the inlet portion 81A of the connector body 81 and is angularly disposed so as to enable a wire conductor or sheathing 90 to be unidirectionally inserted into the inlet end portion 81A so as to be retained by the free end 83A of the retaining device 83 in a manner whereby the wire conductor 90 is prohibited from being unintentionally separated from the connector body.

To effect the release of the wire conductor, one need only to insert an appropriate tool to effect displacement of the retainer device away form the wire conductor or covering sheath 90, to effect the withdrawal of the conductor sheath 90.

FIG. 37 illustrates a slightly modified wire retainer device 91. The modified wire retainer device 91 is similar to that the wire retainer 83, herein described, with the exception that the free end of the blank 91A is provided with an end notch 92 to define a pair of finger portions 93 for engaging and retaining a wire conductor, as hereinbefore described. In all other respects, the structure of embodiment FIG. 37 is similar to the wire retainer 83 as described.

To complete the connector assembly 80, an end ring insert 84 may be provided to protect the wire conductors 90A that extend beyond the outlet end 81B, as noted in FIG. 44. The illustrated ring inset 84 preferably formed of a suitable plastic, comprises a ring body 84A having an outwardly radially extending flange 84B. Blanked out of the plane of the ring body are opposed tangs 84C which are outwardly bent. The outer diameter of the ring body 84A is slightly smaller than the diameter of the opening 82A formed in the face portion of the external retainer ring 82. The arrangement is such that the ring insert 84 can be readily snap fitted to the opening 82A of the external retainer ring 82 and the outlet opening of the outlet end portion 81B. The insert body tangs 84C function to enable the ring insert 84 to be readily snap fitted to the outlet end portion 81A, so that the ring insert 84 is prohibited from being unintentionally separated therefrom.

Intermediate the opposed opening of the connector body, there is provided a radially outwardly projecting stop flange 95, which functions to limit the insertion of the connector assembly through a knock-out hole of an electric panel or electric box, as hereinbefore described.

FIGS. 45 to 51 illustrate a further embodiment of the invention. This embodiment of FIGS. 45 to 51 is directed to a snap-fit electrical connector assembly 100 which is particularly suitable for attaching an electric cable or conductor 101 to an electric box 102 which is disposed in a finish wall structure 103.

It is frequently necessary to upgrade, repair, or add new electric conductors or circuits to existing electric boxes concealed within the wall of an existing structure. In such instances, the installer is generally unable to access a snap-fit connector so as to apply the necessary pulling or pushing force necessary to insert and lock a snap-fit connector assembly, e.g. 100, in a knockout opening of the electric box 102. Heretofore, in such situations, the installer generally utilized a connector having a threaded outlet end which could be readily passed through a knockout hole of an electric box, which could then be secured by threading thereon a lock nut from within the box opening, which is both difficult and time consuming.

The connector assembly 100, as illustrated, includes a connector body 104 having a leading end or outlet end 105 and a trailing or inlet end 106. The connector body may be formed as a metal casting of a suitable material, e.g. a zinc alloy, having a bore 107 extending therethrough. Circumscribing the connector body 104 between the outlet end 105 and the inlet end 106 is a radially outwardly extending stop flange 108. As hereinbefore described, the outer surface S of the outlet end 105 tapers or converges inwardly toward the central axis of the connector body 104 and the outlet opening 109.

Figure 46:
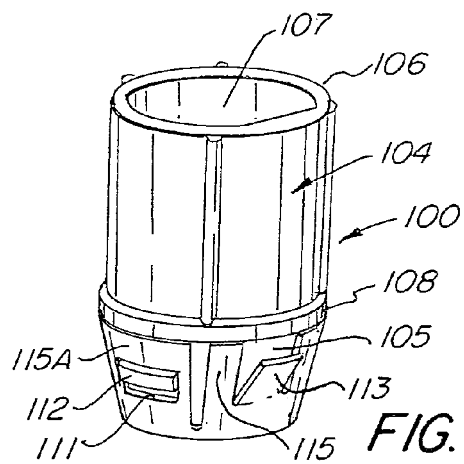
FIG. 46 is a perspective view similar to FIG. 45 illustrated in the assembled position.
Figure 47:
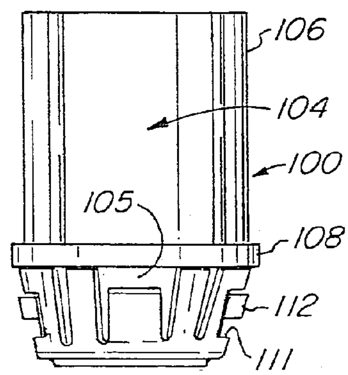
FIG. 47 is a side view of FIG. 46.
Figure 48:
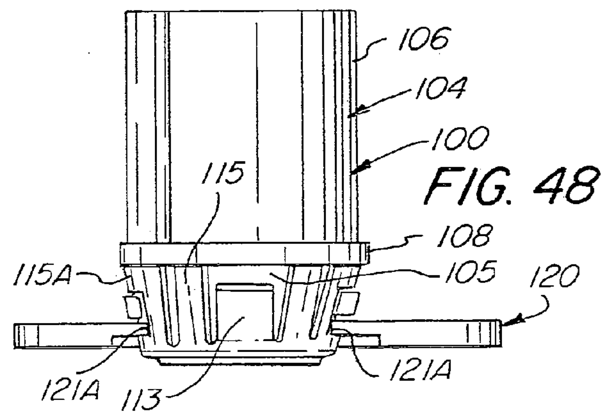
FIG. 48 is a side view of the connector assembly of FIG. 47 in engagement with a pulling tool of the present invention.

Complementing the slope or taper of the outer surface S of the outlet end 105 is a frustro-conical snap-fit retainer ring 110 which is similar in structure hereinbefore described with respect to FIGS. 1 to 4, except that the retaining slot 111 adapted to receive the retaining lug 112 is enlarged, as compared to the retaining slot 21 as hereinbefore described. As best seen in FIGS. 47 and 48, the retaining slot 111 has a width which is greater than the width of the retainer lug 112 adapted to be received in slot 111 in the assembled position, as best illustrated in FIGS. 46 and 47. In all other respects, the structure of the retainer ring 110 is similar to the construction of retainer ring 18 hereinbefore described with respect to the embodiments illustrated, for example in FIGS. 1 to 4, and which need not be repeated.

It will be understood that a conductor retainer means, similar to any of those hereinbefore described with respect to FIG. 8, FIGS. 11–18, and FIGS. 33–36 may be associated with the inlet end 106 of the connector embodiment illustrated in FIGS. 45 to 48 for receiving and retaining the wire conductor 101 to prohibit any unintentional separation of the wire conductor 101 from the connector assembly 100.

Figure 50:
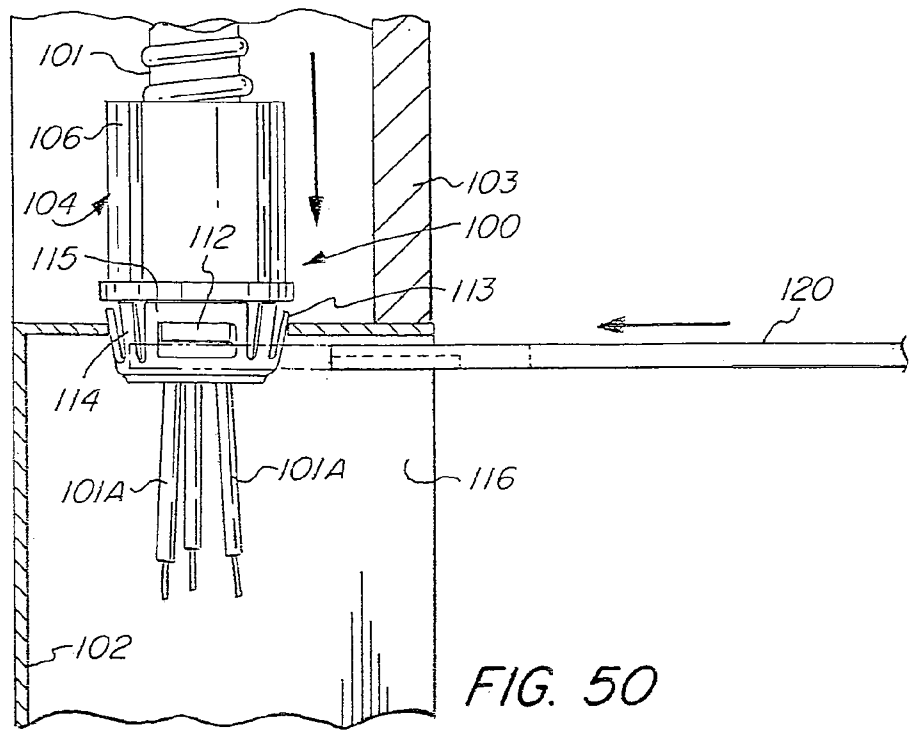
FIG. 50 is a side elevation view illustrating the initial insertion of the connector assembly of FIG. 45 into a knockout hole of an electric box and in engagement with an operating tool.
Figure 51:
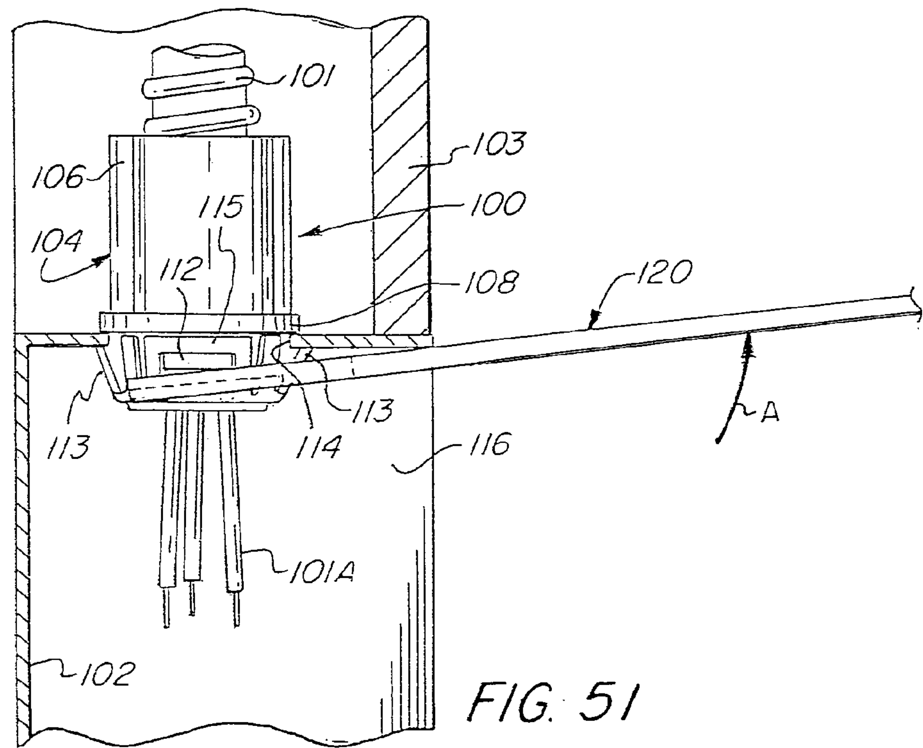
FIG. 51 is a side elevation view similar to FIG. 50 illustrating the connector assembly fully seated and locked in the knockout hole of an electric box which is affected by the lever action of the operating tool.

Because of the amount of force that is required to be applied to the connector assemblies as herein described, it has been noted that great difficulty has been encountered in the field when installers or electricians attempted to utilize snap-fit connectors for connecting wire conductors, cable or the like to a knock-out opening 114 of an electric box 102 seated within an established or finished wall structure 103 as shown in FIGS. 50 and 51. This is because the installer had insufficient access to the connector assembly to apply thereto the necessary pushing or pulling force required to overcome the spring tension or deflection of the locking tangs 113, required to seat the connector assembly in the knockout opening 114 of the electric box 102 in a finished wall installation.

To facilitate seating and locking a snap-fit connector assembly 100 in a knockout hole 114 of an electric box 102 supported in a finished or existing wall 103 as described herein, this invention contemplates an installation tool 120 which is designed to complement the circumference of the outlet end 105 of the connector assembly 100. Since the outlet end 105 and the circumscribing retainer ring 110 are frustro-conical and converge toward the outlet opening 109, the connector assembly 100, as shown in FIG. 50, can be brought into ready alignment with the knockout opening 114. However, due to the outward flare of the locking tangs and the trailing end of the frustro-conical retaining ring 110, it is prohibited from being seated or locked to the knockout hole 114, until such time that a sufficient force is applied to effect the flexing of the locking tangs 113 and to a lesser extent, the grounding tangs 115.

As access to the connector assembly 100, as shown in FIG. 50, is limited and prohibits an installer from applying the necessary force to pull or push the connector assembly 100 to seat and lock the connector assembly in the knockout opening 114, an installation tool 120 is provided to facilitate the seating and locking of the connector assembly 100 to the electric box 102. As best seen in FIGS. 52 to 55, the installation tool 120 comprised simply of an elongated flat metal plate 120A. Formed at one end of the plate 120A is a generally U-shaped cutout 121 formed with parallel edges 121A joined at the inner ends thereof by an arcuate segment 121B shaped to complement the curvature or arcuate portion of the frustro-conical retainer ring 110.

Figure 52:
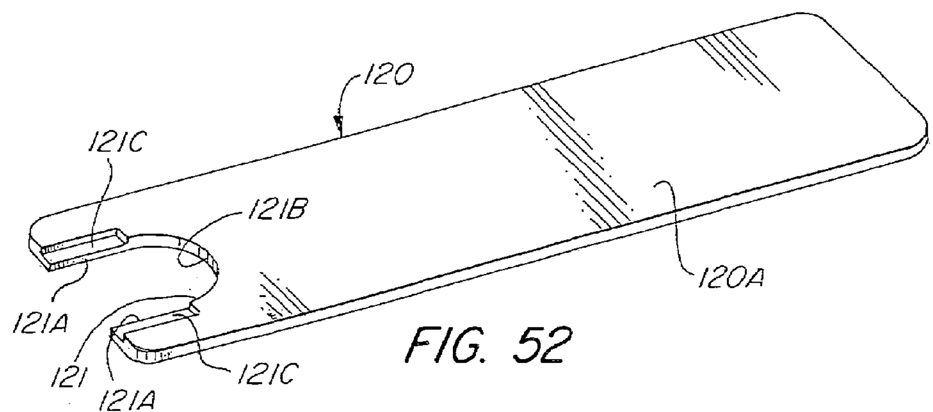
FIG. 52 is a perspective view of the operating tool embodiment for facilitating the locking of an electrical connector to an electric box.
Figure 53:
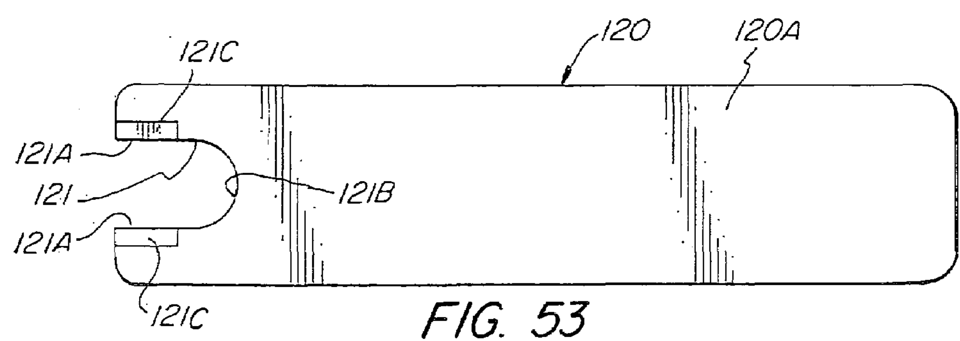
FIG. 53 is a plan view of the tool of FIG. 52.
Figure 54:
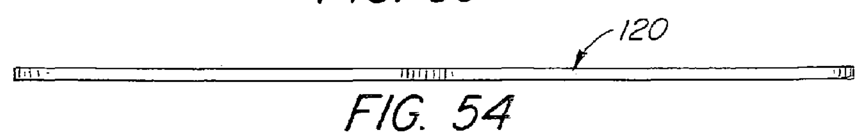
FIG. 54 is an edge view of FIG. 53.
Figure 55:
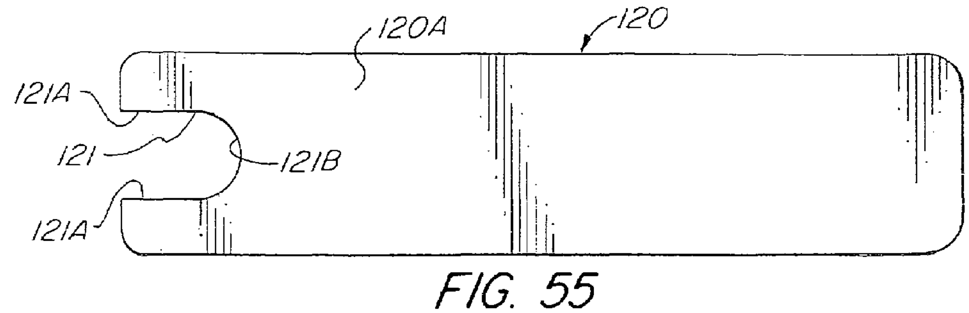
FIG. 55 is a bottom plan view of FIG. 53.
Figure 56:
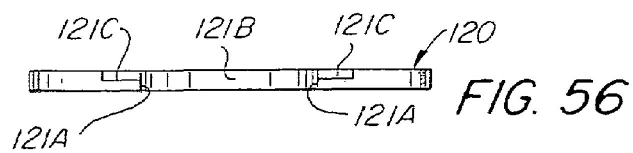
FIG. 56 is a left end view of FIG. 53.

In accordance with this invention, the opposed parallel edges 121A, 121A are sized and shaped to engage the enlarged retaining slot 111 as the tool 120 in inserted through the open end of the electric box 102, as best seen in FIG. 50. It will be understood that the thickness of the plate 120A at the parallel edges 121A, 121A of the cutout portion 121 should be slightly less than the opposed open area of the enlarged retaining slots 111. In the event that the thickness of plate 120A at end 120A' is greater than the open area of the enlarged retainer slot 111 formed in the retaining ring 110, a portion of the plate 120A adjacent the parallel edges 121A, 121A, as best seen in FIG. 52, may be machined away or removed as indicated at 121C so as to reduce the thickness of the parallel edges 121A, 121A an amount sufficient to permit the opposed parallel edges 121A, 121A to be received in the open or enlarged unoccupied area of the retainer slot 111.

Figure 57:
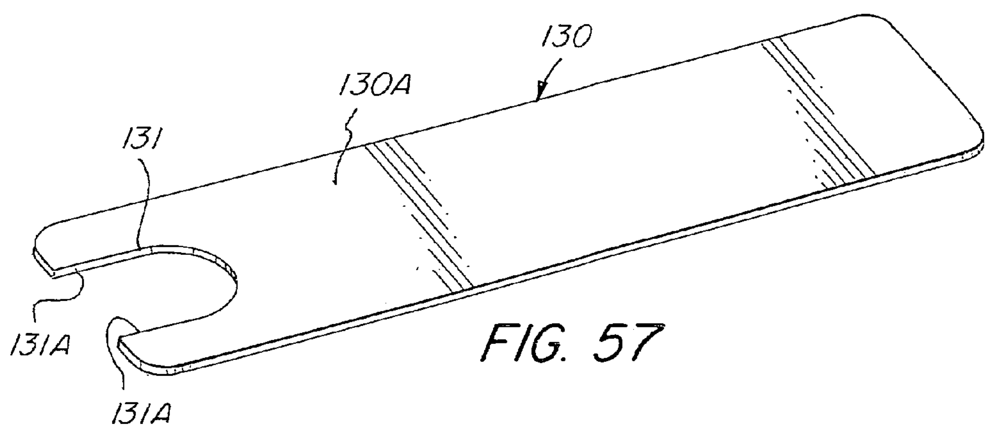
FIG. 57 is a perspective view of a modified tool.
Figure 58:
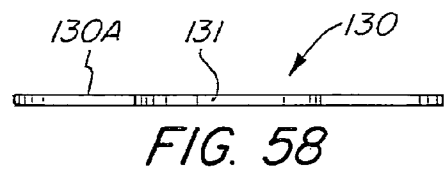
FIG. 58 is a left end view of FIG. 57.

FIGS. 57 and 58 illustrate a slightly modified tool embodiment 130. The tool embodiment 130 is similar to that described with respect to FIGS. 52–56 except that the thickness of the plate 130A is uniform, i.e. the thickness of the plate 130A is slightly less than the available open or unoccupied area of the enlarged retainer slot 111, which is not occupied by the retainer lug 112 when the retainer ring is assembled to the connector body. In tool embodiment 130, the parallel edges 131A, 131A of cutout 131 need not require any machining or removal of any material of the plate to size the thickness of the edges 131A, 131A, as described with respect to tool 120.

Figure 59:
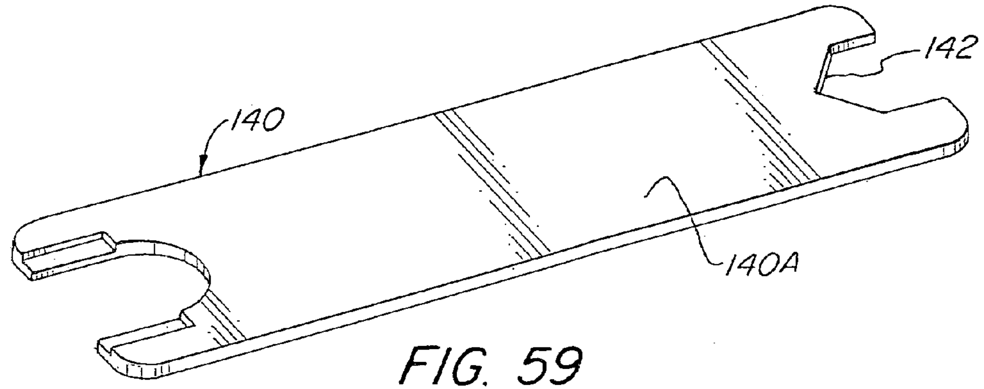
FIG. 59 is a perspective view of still another modified operating tool.

FIG. 59 illustrates another slightly modified embodiment of a tool 140. Tool 140 is similar to that hereinbefore described, except that the other end of the plate 140A is provided with a polygonic shaped cutout 142 to define an open end wrench sized and shaped to accommodate a conventional complementary polygonic lock nut (not shown) in the event a connector having an externally threaded outlet end may sometimes be used to secure a wire or cable to an electric box. Tool 140 thus has the versatility to be used to secure either a conical snap-fit connector assembly 100 as described herein, or a conventional externally threaded connector assembly secured by a lock nut, e.g. a hexagonic sided lock nut.

In operation, the connector assembly 100, with the electrical conductor 101 attached thereto as described herein, is disposed in alignment with a knockout hole 114 of an electrical box 102 installed in a finished wall 103. Since the connector assembly has a frustro-conical outlet end, it can be readily positioned in a knockout hole 114 and rest therein so that the enlarged or unoccupied portion of the retaining slot 111 is rendered accessible from within the front opening 116 of the electric box 102, as best seen in FIG. 50. Because of the outwardly bent locking tangs 113, the connector assembly 100 cannot be normally passed through the knockout hole 114 without a pulling or pushing force being imparted onto the connector assembly 100. Applying a pulling force on the individual wires 101A of the conductor 101 is not advisable, as any such pulling force may damage the insulated covering of the individual wire conductors 101A or be pulled through the connector assembly 100 depending upon the type or kind of conductor retainer that is associated in the inlet end 106 of the connector body 104.

Figure 49:
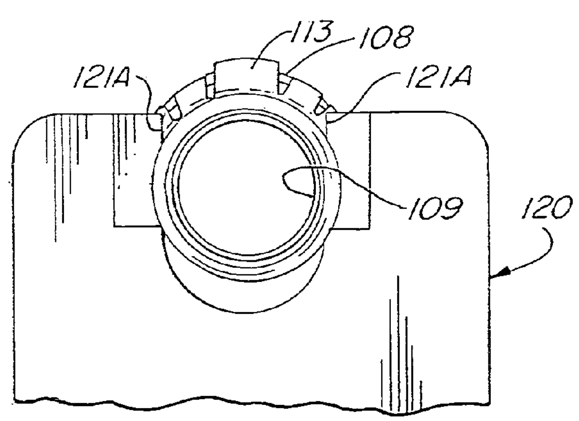
FIG. 49 is a bottom plan view of FIG. 48.

According to this invention, the locking of the connector assembly 100 to the knockout hole 114 is achieved, without any injury to the conducting wires, simply by inserting the tool 120 through the open end 116 of the electric box 102 so that the parallel edges 121A, 121A of the cutout 121 engage the respective opposed enlarged or unoccupied portion of the retaining slot 111 immediately below the retaining lugs 112, as indicated in FIGS. 48 to 50. This can be achieved by inserting the tool 120 into the electric box slightly below the upper end of the electric box and substantially parallel thereto. With the edges of the cutout 121 engaged in the opposed enlarged or unoccupied portions of the retaining slots 111, an upward force as indicated by the force arrow A (FIG. 51) adjacent the outer end of the tool will cause the other end of the tool 120 to pull the outlet end 105 through the knockout hole 114 to seat and lock the connector assembly 100 and connected conductor or cable 101 to the electric box with a minimum of effort quickly and simply with a minimum of applied force. As noted in FIG. 51, the tool 120 functions as a lever that uses the corner of the electric box at the open end thereof as a fulcrum about which the tool pivots, to pull the connector assembly downwardly with sufficient force to flex the locking tangs inwardly, permitting the connector assembly to pass through the knockout hole 114, whereby the inherent spring energy of the locking tangs causes the locking tangs to spring outwardly and lock the connector assembly 100 in place within the knockout hole.

Figure 60:
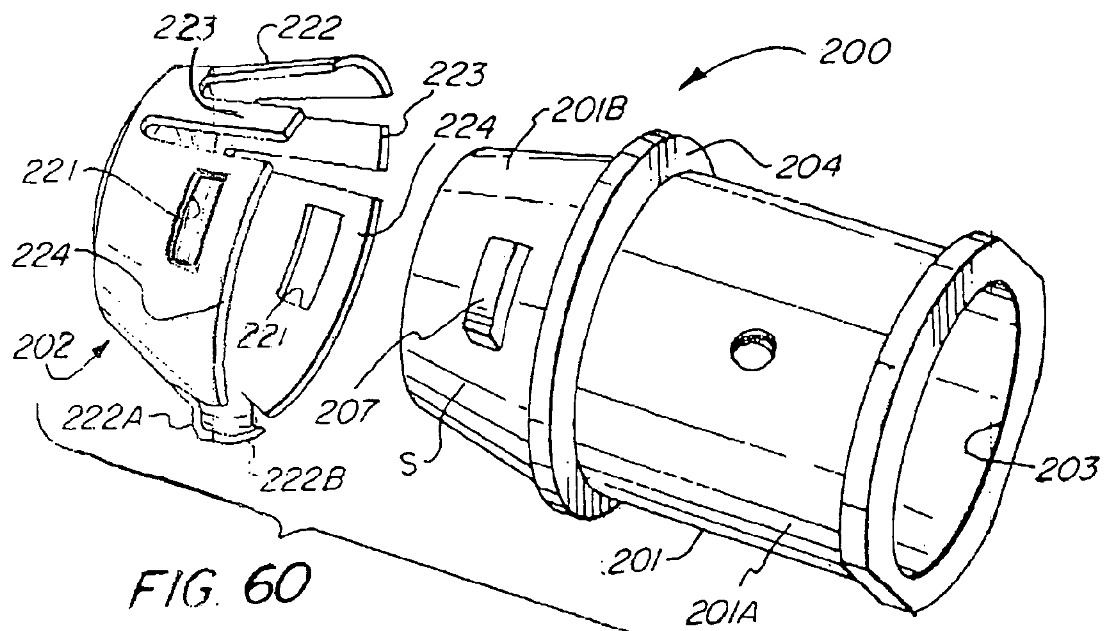
FIG. 60 is an exploded perspective view of another modified form of the invention.
Figure 61:
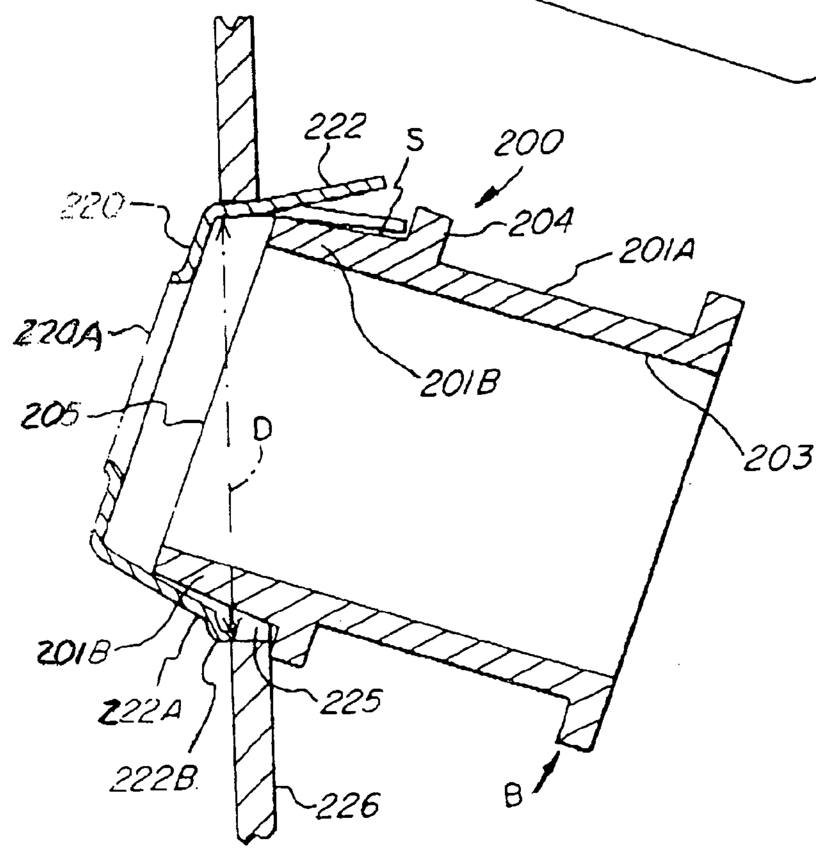
FIG. 61 is a section side view of the embodiment of FIG. 60 illustrating the manner for effecting the connection of the modified embodiment of FIG. 60 to a knock-out hole of an electric box.
Figure 62:
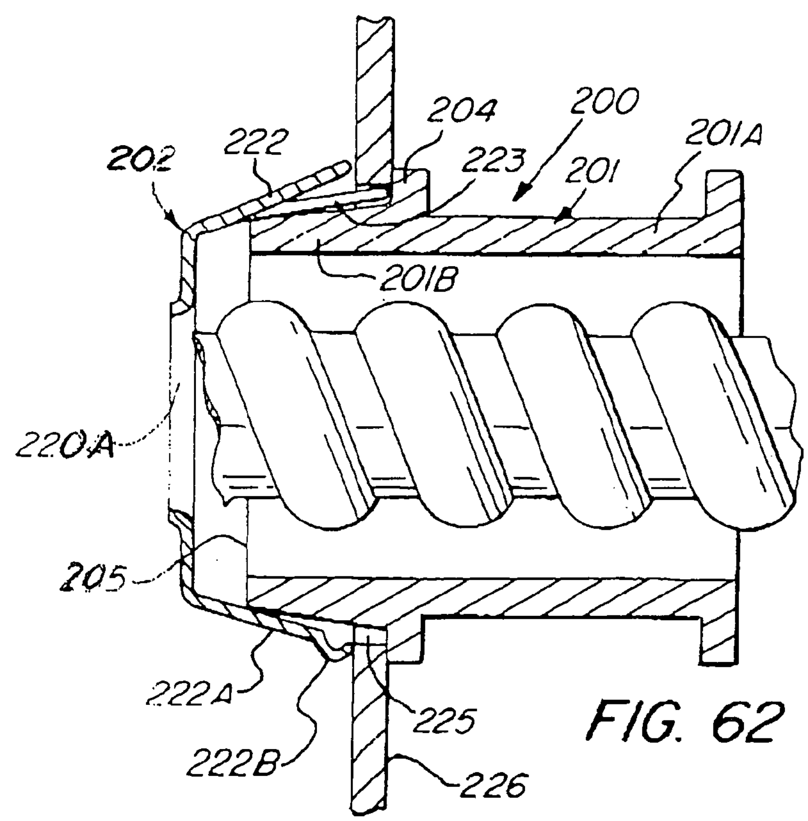
FIG. 62 is a section side view similar to FIG. 61 illustrating the connector assembly of FIG. 61 in locked position relative to an electric box.
Figure 63:
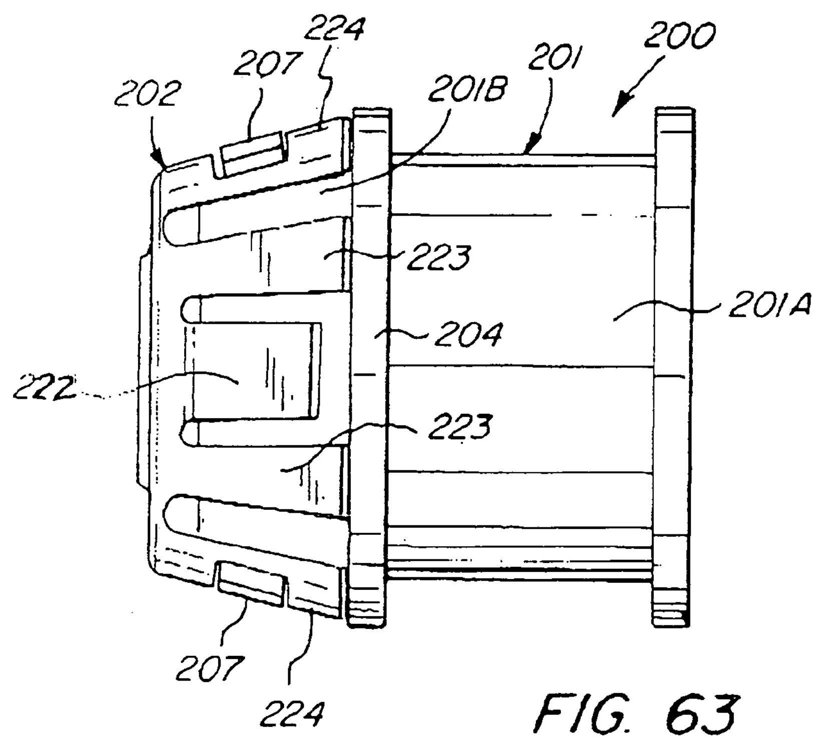
FIG. 63 is an assembled view of FIG. 1 connector
Figure 64:
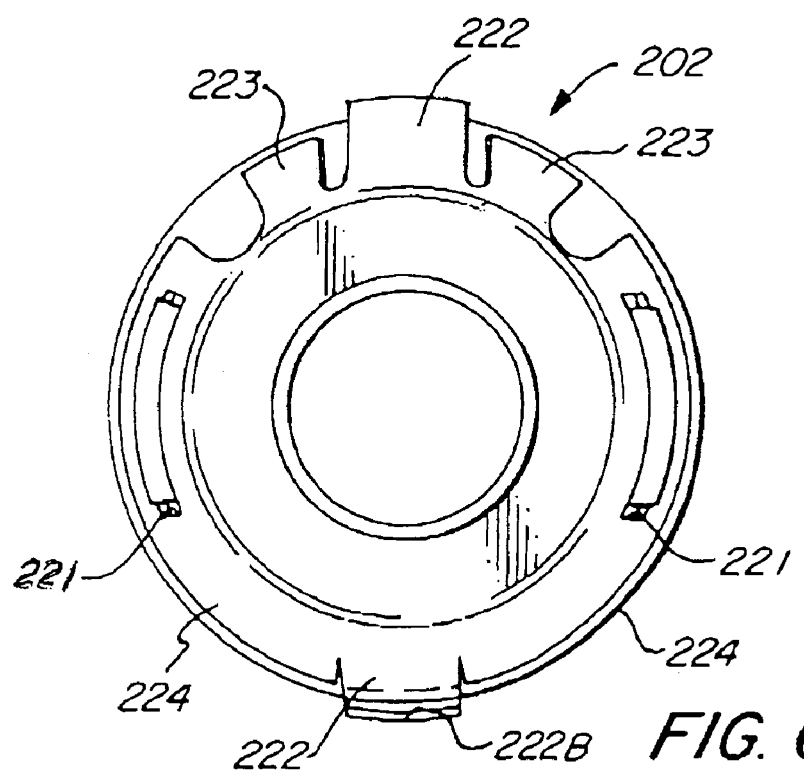
FIG. 64 is a front end view of the frustro-conical retainer ring of the embodiment illustrated in FIG. 60.

FIGS. 60 to 64 illustrate a further embodiment of the invention. As best seen in FIGS. 61 and 62, the connector assembly 200 comprises a connector body 201 and a modified outer frustro-conical retainer ring 202 as will be described hereinafter. As hereinbefore described, the connector body 201 is formed as a metal casting that includes an inlet end portion 201A and an outlet end portion 201B and having a bore 203 extending therethrough. Defining the inlet end portion 201A from the outlet end portion is a circumscribing radially outwardly extending stop flange 204.

As hereinbefore described, the outer surface "S" of the outlet end portion 201B slopes or tapers downwardly from the stop flange 204 to the outlet opening 205. Formed on the sloping surface S of the outlet end portion 201B are a pair of oppositely disposed retaining lugs 207 that project outwardly from the sloping surface S.

Arranged to circumscribe the sloping surface S of the outlet end portion 201B is the frustro-conical retaining ring 202. The retaining ring 202 is formed of a blank substantially like that shown and described in FIG. 2, with the exception that one of the tangs, e.g. tang 222A, is designed to function as an auxiliary tang 222A, as will be hereinafter described.

The retaining ring 202 has formed out of the plane thereof at least one locking tang 222, and a series of grounding tangs 223 and 224.

Figure 66:
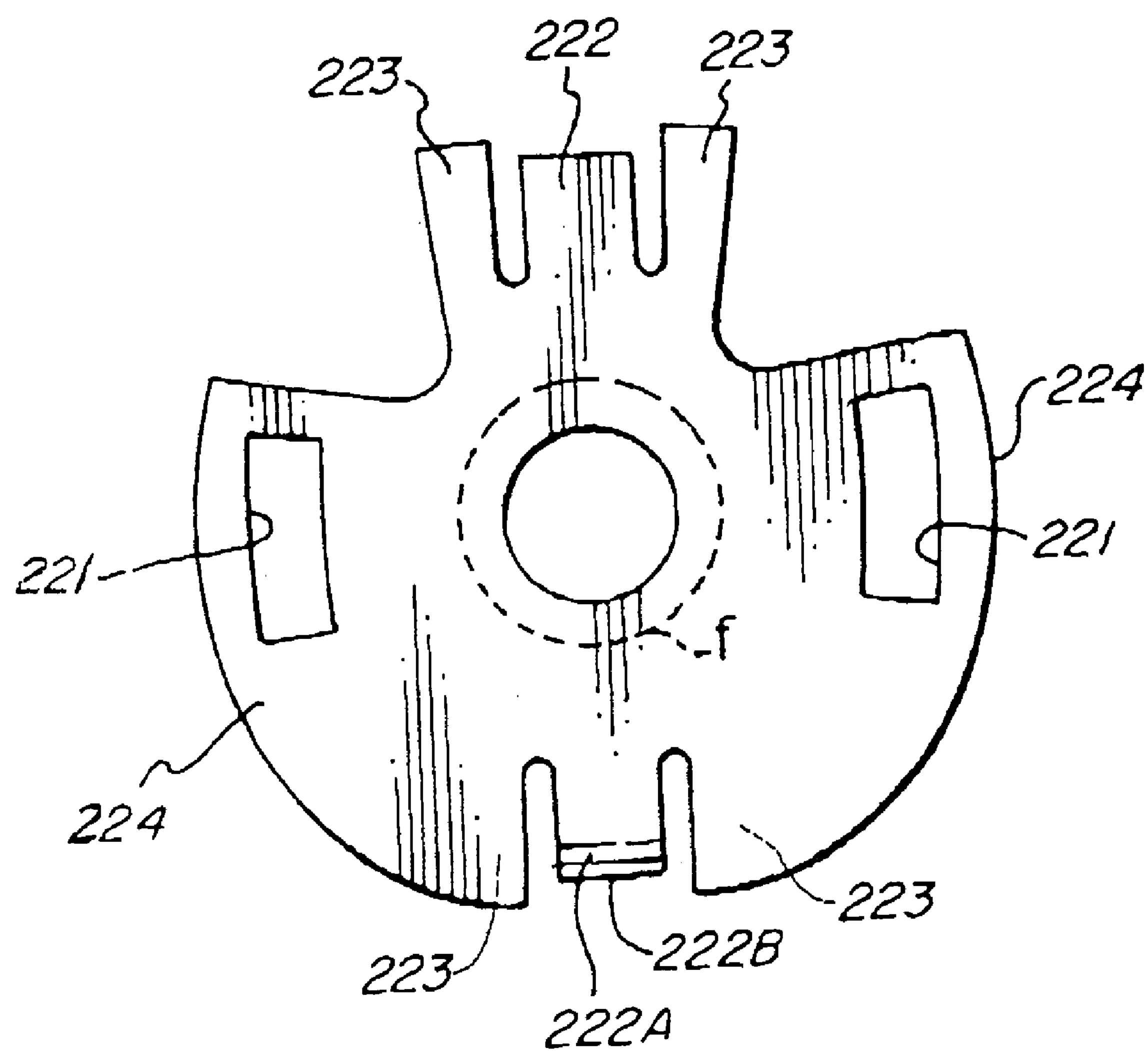
FIG. 66 is a plan view of a modified blank for forming a frustro-conical snap fit retaining ring.

The frustro-conical retaining ring 202 is similar to that hereinbefore described with respect to FIGS. 2 to 5, with the exception that the grounding tangs 224 extend through a greater arcuate portion of the trailing edge from that shown in FIG. 2, and that an auxiliary tang 222A is formed between the adjacent side edges of the grounding tangs 224. Reference is made to FIG. 66 which illustrates the plan view of the blank from which retainer ring 202 is formed. As best seen in FIG. 61, the auxiliary tang 222A at its trailing edge is formed with a transversely formed lip 222B which projects outwardly of the plane of auxiliary tang 222A, which functions as a fulcrum about which the connector body 201 is pivoted to lock the connector assembly 200 relative to a knock-out hole 225 of an electric box or panel 226, as will be hereinafter described.

Referring to FIG. 66, which is a plan view of the modified blank from which retainer ring 202 is formed, it will be noted that the trailing edge of the grounding tangs 224 extend through an arc approximately twice those of FIG. 2, with the auxiliary tang 222A being disposed between the adjacent side edges of the grounding tangs 224, and which auxiliary tang 222A is disposed opposite the locking tang 222. Also, the auxiliary tang 222A is formed with a transverse lip 222B at its trailing edge. In the assembled or formed position, the retainer ring 202 has a leading face surface 220 having an opening 220A, similar to that hereinbefore described.

The opposed grounding tangs 224 are provided with retaining slots 221 adapted to receive the retaining lugs 207 when the retainer ring 202 is assembly onto the outlet end portion 201B. The locking tang 222, as best seen in FIGS. 60 and 61, has the free end thereof laterally bent out of the outer plane of the retainer ring 202 at an angle greater than that of the sloping surface of the retainer ring. The auxiliary tang 222A disposed opposite the locking tang 222 is likewise laterally bent outwardly of the sloping surface of the retainer ring 202. In the illustrated embodiment, the auxiliary tang 222A at its free end is provided with a slight outwardly formed arcuate lip 222B, as best seen in FIGS. 60 and 61.

While the embodiment of the connector assembly 200 of FIGS. 60–64 is illustrated without any electrical conductor retaining means associated with the inlet end portion 201A of the connector body 201, it will be understood that the inlet end portion 201A may be fitted with any of the wire conductor retainer means as described herein, the descriptions of which need not be repeated.

With the construction of the electric connector assembly 200 as described, it will be apparent that the connector assembly 200 can be readily installed and locked in place to any standard type electric box 226 having a knock-out hole 225, as evident in FIGS. 60 and 61, with a minimum of applied force. Because of the frustro-conically shaped front or leading end of the outlet end portion 201B, the connector assembly 200 can be inserted to a knock-out hole 225 of a standard electric box or panel 226 by angling the connector assembly 200 relative to the knock-out hole 225, as noted in FIG. 61. As shown in FIG. 61, the connector assembly is sized so that the auxiliary tang 222A can be readily inserted through the knock out hole 225 without any excess force necessary to deflect the rigid but flexible locking tang 222. By tilting the connector assembly 200 as shown in FIG. 61, the free end of the auxiliary tang 222A can be readily passed through the knock-out hole 225 without requiring the force necessary to deflect the auxiliary tang 222A or the locking tang 222. This is rendered feasible because of the frustro-conical shape of the outlet end portion and the complementary shaped retaining ring 202 as long as the diagonal distance D between the leading end of the locking tang 222 and the free trailing end 222B of the auxiliary tang 222A is slightly less than the diameter of the knock-out hole 225. With the auxiliary tang 222 passed through the knock-out hole 225 obliquely, as shown in FIG. 61, the installer need only to provide an upward turning force as indicated by force arrow B (FIG. 61) on the outlet end portion 201B, causing the locking tang 222 to rotate through the knock-out hole 225 to lock the connector assembly to the knock-out hole 225, as seen in FIG. 62. It will be noted that as a force B is applied to the inlet end portion of the connector body, the free end 222B of tang 222A acts as a fulcrum about which the connector body 201 rotates and in doing so, forces the locking tang 222 to deflect and pass through the knock-out hole 225. As the free end of the locking tang 222 passes through the knock-out hole 225, the inherent resiliency of the locking tang 222 causes the free end to spring out to lock the connector assembly within the knock out hole 225. With the connector assembly 200 locked in place as shown in FIG. 61, the free end 222B of the auxiliary tang 222A and locking tang 222 prohibits any unintentional separation of the connector assembly from the electric box 226. With the connector assembly locked in place, as noted in FIG. 62, the inherent resiliency of the grounding tangs 223 and 224 exert a spring bias to ensure that the free ends of the grounding tangs 223 and 224 are biased toward and in contact with the internal periphery of the knock-out hole 225, thereby providing a positive electrical grounding between the connector assembly and the electric box 226, as hereinbefore described.

With the construction of the connector assembly 200 described, it will be noted that the insertion and locking of the connector assembly 200 in a knock-out hole 225 requires that a single locking tang 222 need only be deflected to effect the insertion of the connector assembly 200 through a knock-out hole and to lock the same to an electric box 226, thereby minimizing the ease and the amount of applied force required to effect the connection. The leverage provided by the rotation of the connector body 201 imparts a further mechanical advantage to reduce the amount of applied force required to set and lock the connector assembly 200 to an electric box, which is substantially less than that required to connect the prior known snap fit connectors that required a force sufficient to deflect a series of circumferentially spaced apart locking tangs.

Figure 65:
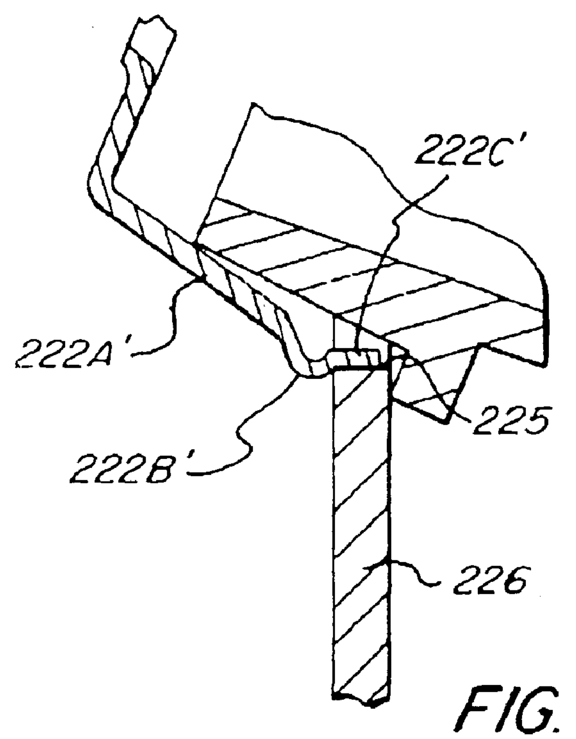
FIG. 65 is a fragmentary detail sectional side view of a modified auxiliary tang construction.

FIG. 65 illustrates a detailed modified form of the auxiliary tang. As shown in FIG. 65, the modified auxiliary tang 222A' is provided with an outwardly formed arcuate lip 222B' similar to that described in FIGS. 60 and 61, and in addition, includes a tail or extension 222C' which is formed to engage to inner periphery of the knock-out hole 225 when the connector assembly is in the inserted and locked position relative to the knock-out opening. In this modified arrangement, the auxiliary tang 222A' in the locked position functions both as a locking tang to prohibit any unintentional separation of the connector from the electric box and also as an electrical ground between the connector assembly and the electric box. When the connector assembly of FIG. 65 is locked to the electric box 226, the protruding lip 222B', together with the one locking tang, prohibits any unintentional separation of the connector assembly from the electric box 226 while the tail or extension 222C' effects an electrical ground between the connector assembly and the electric box. In all other respects, the retainer ring is structural and functional similar to that the manner hereinbefore described with respect to FIGS. 60 to 63.

While the present invention has been described with respect to several embodiments, it will be understood that various modifications may be made without departing from the spirit or scope of the invention.

What is claimed is:

1. An electric connector assembly comprising:

a connector body having an inlet end portion, and an outlet end portion, said outlet end portion defining an outlet opening, a radially outward extending stop flange formed about an intermediate portion of said connector body, and a snap fit retaining ring having a leading end and a trailing end, and having a frustro-conical configuration wherein the diameter of the trailing end of said frustro-conical configuration is greater than the diameter of said leading end thereof, said frustro-conical retaining ring having at least one locking tang and grounding tang formed out of the surface of said retaining ring, and means for securing said retaining ring onto said outlet end portion of said connector body.

2. An electric connector assembly as defined in claim 1 wherein said securing means includes an external outwardly projecting lug connected to said outlet end portion, and said frustro-conical retaining ring including a slot for receiving said projecting lug in the assembled position of said connector body and retaining ring.

3. An electric assembly as defined in claim 2 wherein said outlet end portion includes an outer sloping surface converging toward the outlet opening.

4. An electric connector assembly comprising:

a connector body having an inlet end portion, and an outlet end portion, said outlet end portion defining an outlet opening, a radially outward extending stop flange formed about an intermediate portion of said connector body, and a snap fit retaining ring having a leading end and a trailing end, and having a frustro-conical configuration wherein the diameter of the trailing end of said frustro-conical configuration is greater than the diameter of said leading end thereof, said frustro-conical retaining ring having at least one locking tang and grounding tang formed out of the surface of said retaining ring, and means for securing said retaining ring onto said outlet end portion of said connector body, wherein said locking tang having a free end outwardly bent relative to the surface of said retainer ring at an angle greater than the slope of said grounding tang, and an auxiliary tang oppositely disposed from said locking tang, said auxiliary tang having a free end outwardly bent out of the surface of said retainer ring, whereby the distance between the leading end of said retaining ring to said free end of said auxiliary tang is slightly less than the diameter of a knock-out hole adapted to receive the connector body with said retainer ring attached thereto.

5. An electric connector assembly as defined in claim 4 wherein said free end of said auxiliary tang terminates in a transverse arcuate lip.

6. An electric connector assembly as defined in claim 5 wherein said auxiliary tang includes a tail extension connected to said arcuate lip to define the free end of said auxiliary tang, whereby said tail extension is adapted to engage the inner periphery of a knock-out hole when the connector body and said retainer ring are fixed to an electric box.

7. An electrical installation comprising:

an electric box having at least one knock-out hole, and an electric connector having a connector body and an associated retainer ring mounted on said connector body for securing said connector to said knock-out hole, said connector body having an inlet end portion defining an inlet opening and an outlet end portion defining an outlet opening, and a bore extending therethrough, a radially outwardly extending flange circumscribing said connector body between said inlet end portion and said outlet portion, said outlet end portion having a sloping outer surface converging toward said outlet opening, means for securing said retainer ring on said outlet end portion, said retainer ring having a leading edge and a trailing edge, and an intermediate portion between said leading edge and said trailing edge, said intermediate portion being sloped to complement the outer sloping surface of said outlet end portion, a locking tang having trailing free end bent angularly outwardly of said intermediate portion at an angle greater than the slope of said intermediate portion, and an auxiliary tang having a free end bent angularly outwardly of said intermediate portion disposed opposite said locking tang whereby the distance between the leading edge of said locking tang and said free trailing end of said auxiliary tang is slightly less than the diameter of said knock-out hole.

8. An electric installation as defined in claim 7 and including:

a series of grounding tangs disposed in the plane of said intermediate portion, said grounding tangs having a free end that is coincidental with said trailing edge of said retainer ring.

9. An electric installation as defined in claim 7 wherein said free end of said auxiliary tang terminates in a transverse lip arranged to engage a wall portion of said electric box when said connector is fitted to said knock-out hole and locked in place thereto.

10. An electric installation as defined in claim 9 wherein said free end of said auxiliary tang includes a lip extension projecting beyond said lip whereby said lip extension engages the inner periphery of said knock-out hole.

11. In combination, an electric box having connected walls defining an electric box having an open end, and at least one knock-out hole formed in at least one of said walls and a connector having a connector body having an inlet end portion and an outlet end portion, said inlet end portion defining an inlet opening and said outlet end portion defining an outlet opening, a bore extending through said connector body, and a stop flange circumscribing said connector body between said inlet end portion and said outlet portion, the improvement comprising:

said outlet end portion having an outer surface converging toward said outlet opening, a retainer ring having a leading edge, a trailing edge and an intermediate sloping surface complementing said converging outer surface of said outlet end portion, means for retaining said retainer ring on said outlet end portion, a locking tang blanked out of the surface of said intermediate sloping surface and cantileverly bent outwardly of said sloping surface at an angle greater than that of said sloping surface, said locking tang having a trailing free end, and an oppositely disposed auxiliary tang having a trailing free end angularly bent outwardly relative to said intermediate sloping surface, whereby the distance between the leading edge of said retainer ring and the trailing tree end of said auxiliary tang is slightly less than the diameter of said knock-out hole.

12. The invention as defined in claim 11 wherein said trailing free end of said auxiliary tang includes a lip defining said free end of said auxiliary tang that is outwardly bent relative to the angle of said auxiliary tang so as to engage a wall surface of said electric box when said connector is installed in said knock-out hole.

13. The invention as defined in claim 12 wherein said auxiliary tang includes a tail extension connected to said lip to define said trailing free end of said auxiliary tang for engaging the inner periphery of said knock-out hole when said connector is installed in said knock-out hole.

14. A method of attaching a connector to and in a knock-out hole of an electric box comprising the steps of:

providing a connector having a connector body formed with an outlet end portion having a downwardly sloping outer surface that converges toward the outlet opening of said outlet end portion, securing a frustro-conically shaped retainer ring onto said outlet end portion of said connector body, said retainer ring being formed with a locking tang and an auxiliary tang circumferentially spaced about the circumference of said retainer ring, and each having a trailing free end cantileverly bent outwardly of the surface of said retainer ring, so that the distance between the leading edge of said locking tang and the trailing free end of said auxiliary tang being less than the diameter of a knock-out hole to which the connector is to be attached, and angling said connector with retainer ring attached thereto relative to said knock-out hole such that the free trailing end of said auxiliary tang is permitted to freely pass through the knock-out hole, and imparting a rotation movement onto the inlet end portion of said connector causing the locking tang to deflect inwardly as said locking tang is rotated through the knock-out hole to seat and lock said connector and associated retainer ring to said knock-out hole.

15. The method as defined in claim 14 and including the step of:

providing the trailing free end of said auxiliary tang with an outwardly protruding transverse lip.

16. The method as defined in claim 15 and including the step of:

providing an extension onto said lip whereby said extension engages the inner periphery of said knock-out hole as connector is seated in said knock-out hole.

* * * * *